(12) United States Patent
Ikegawa

(10) Patent No.: US 9,140,314 B2
(45) Date of Patent: *Sep. 22, 2015

(54) ELECTROMAGNETIC CLUTCH

(75) Inventor: Atsutoshi Ikegawa, Paris (FR)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 90 days.

This patent is subject to a terminal disclaimer.

(21) Appl. No.: 14/003,211

(22) PCT Filed: Apr. 10, 2012

(86) PCT No.: PCT/JP2012/059788
§ 371 (c)(1),
(2), (4) Date: Sep. 4, 2013

(87) PCT Pub. No.: WO2012/147510
PCT Pub. Date: Nov. 1, 2012

(65) Prior Publication Data
US 2013/0341150 A1 Dec. 26, 2013

(30) Foreign Application Priority Data

Apr. 27, 2011 (JP) ................................. 2011-099898
Nov. 8, 2011 (JP) ................................. 2011-244749

(51) Int. Cl.
F16D 27/105 (2006.01)

(52) U.S. Cl.
CPC .................................... F16D 27/105 (2013.01)

(58) Field of Classification Search
CPC .................................................... F16D 27/105
USPC ...................................................... 192/84.81
See application file for complete search history.

(56) References Cited

U.S. PATENT DOCUMENTS 4,273,226 A 6/1981 Takefuta et al.
5,031,744 A 7/1991 Nishimura (Continued)

FOREIGN PATENT DOCUMENTS

CN 101140017 A 3/2008
CN 201428759 Y 3/2010

(Continued)

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) issued on Oct. 29, 2013, by the International Bureau of WIPO in corresponding International Application No. PCT/JP2012/059788 (6 pages).

(Continued)

*Primary Examiner* — Richard Lorence
(74) *Attorney, Agent, or Firm* — Buchanan Ingersoll & Rooney PC

(57) ABSTRACT

An electromagnetic clutch is configured to achieve a cutoff state by changing a winding diameter of a wrap spring. The electromagnetic clutch includes a driving element connected to a shaft and supporting one end of the wrap spring, an operating element fitted on the shaft and supporting the other end of the wrap spring, and an armature rotatable in unison with the shaft between the driving element and operating element and movable along a rotational axis. A main aperture is formed in the operating element while an auxiliary aperture is formed in the armature to achieve a positional relationship to electrify an electromagnetic solenoid to attract the operating element and then allow rotation of the driving element by dynamic inertia and attract the armature to the operating element with the wrap spring being remote from an inner surface of an input pulley.

18 Claims, 14 Drawing Sheets

(56) References Cited

U.S. PATENT DOCUMENTS

| | | |
|---|---|---|
| 5,967,274 A | 10/1999 | Leone et al. |
| 8,545,191 B2 * | 10/2013 | Ikegawa et al. ............... 417/223 |
| 2002/0065171 A1 | 5/2002 | Raber |
| 2005/0045445 A1 | 3/2005 | Van Heteren et al. |
| 2008/0041686 A1 | 2/2008 | Hoshino et al. |
| 2009/0039136 A1 | 2/2009 | Tanimoto et al. |
| 2011/0236230 A1 | 9/2011 | Ikegawa et al. |
| 2013/0112523 A1 * | 5/2013 | Ikegawa .................... 192/74 |
| 2013/0341151 A1 * | 12/2013 | Ikegawa .................... 192/84.81 |

FOREIGN PATENT DOCUMENTS

| | | |
|---|---|---|
| JP | 58-134235 A | 8/1983 |
| JP | 3-129130 A | 6/1991 |
| JP | 3-48421 Y2 | 10/1991 |
| JP | 11-201191 A | 7/1999 |
| JP | 2001-317565 A | 11/2001 |
| JP | 2007-118170 A | 5/2007 |
| WO | WO 2010/054487 A1 | 5/2010 |

OTHER PUBLICATIONS

International Search Report (PCT/ISA/210) mailed on Jul. 17, 2012, by the Japanese Patent Office as the International Searching Authority for International Application No. PCT/JP2012/059788.

Written Opinion (PCT/ISA/237) mailed on Jul. 17, 2012, by the Japanese Patent Office as the International Searching Authority for International Application No. PCT/JP2012/059788.

Japanese Office Action for JP 2011-244749 dated Jul. 9, 2012.

Office Action issued on Apr. 3, 2015, by the Chinese Patent Office in corresponding Chinese Patent Application No. 201280010378.9. (6 pages).

Extended European Search Report issued on Jun. 15, 2015, by the European Patent Office in corresponding European Patent Application No. 12776307.6-1756. (6 pages).

* cited by examiner

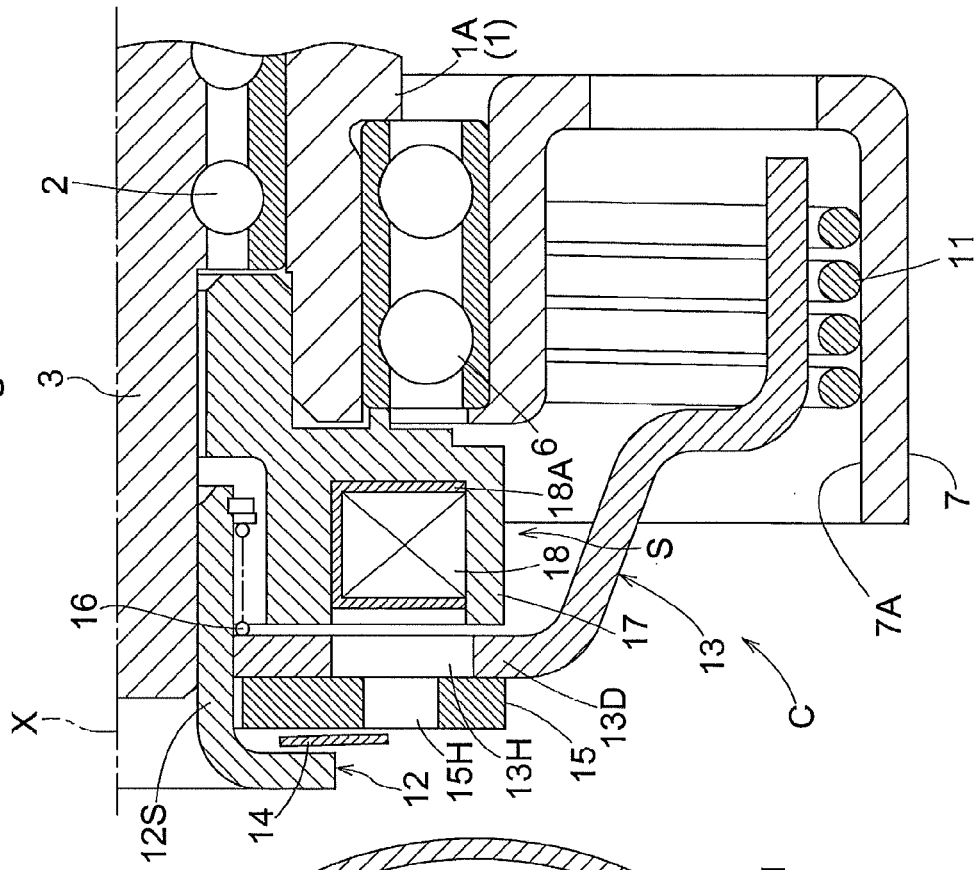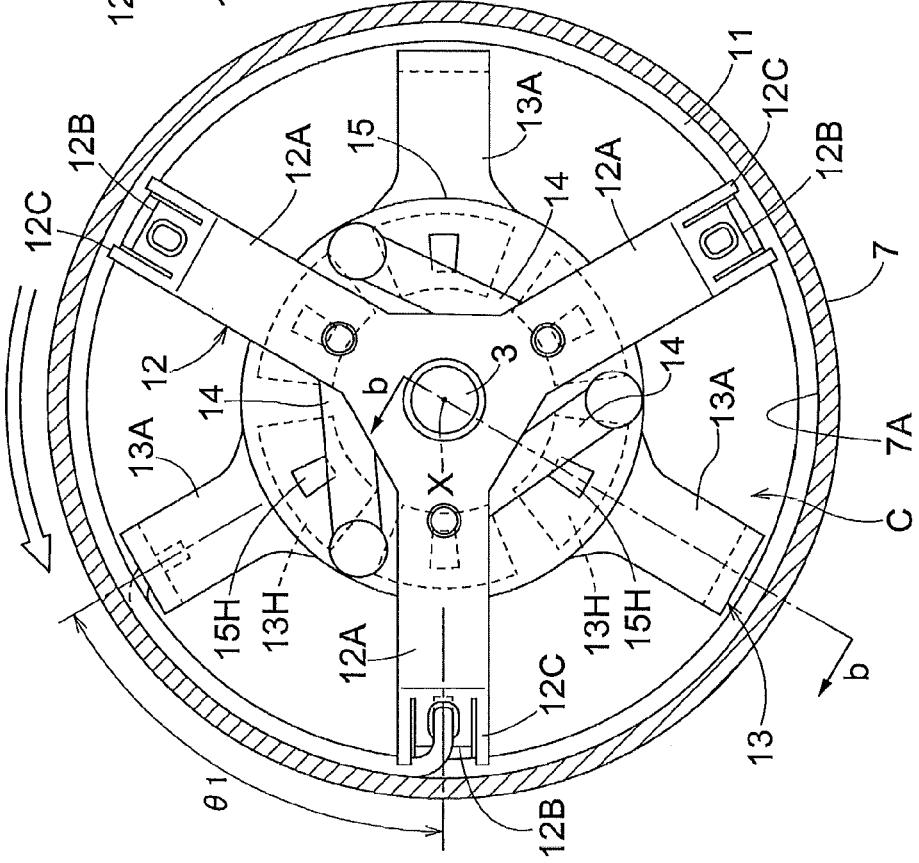

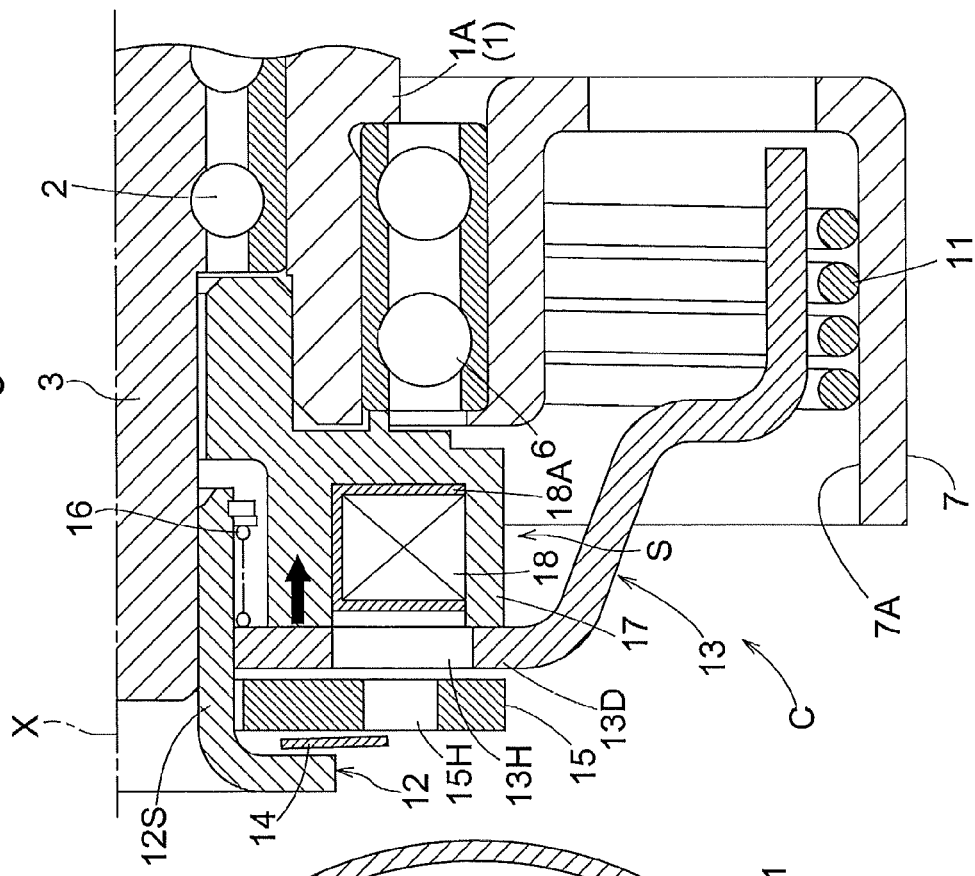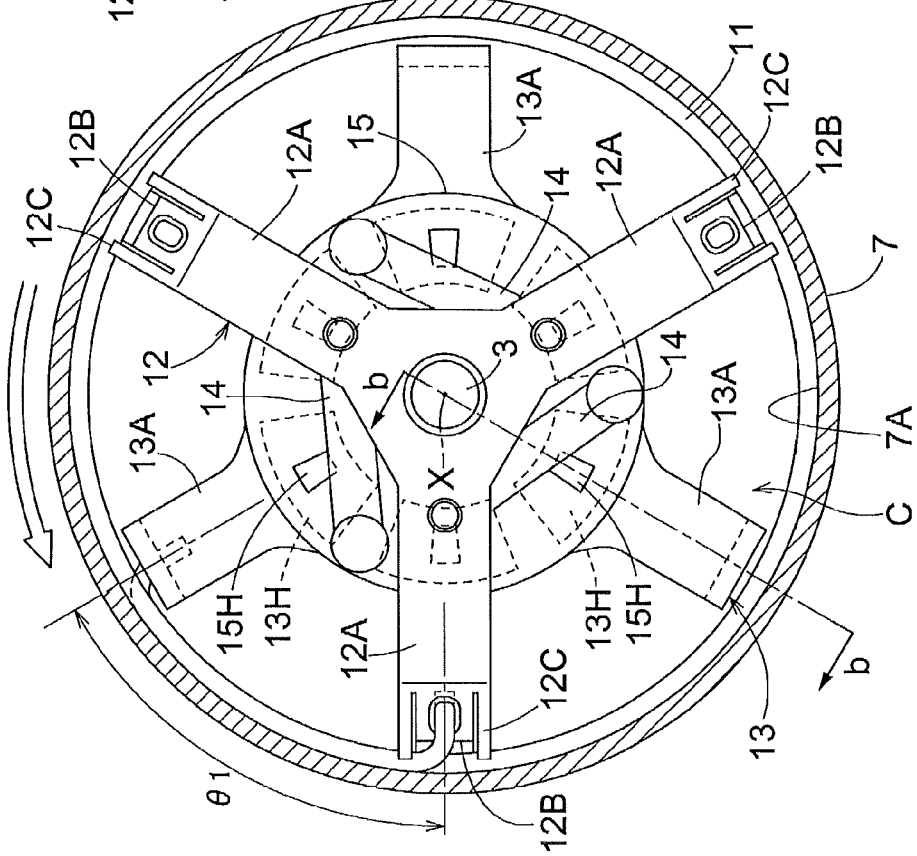

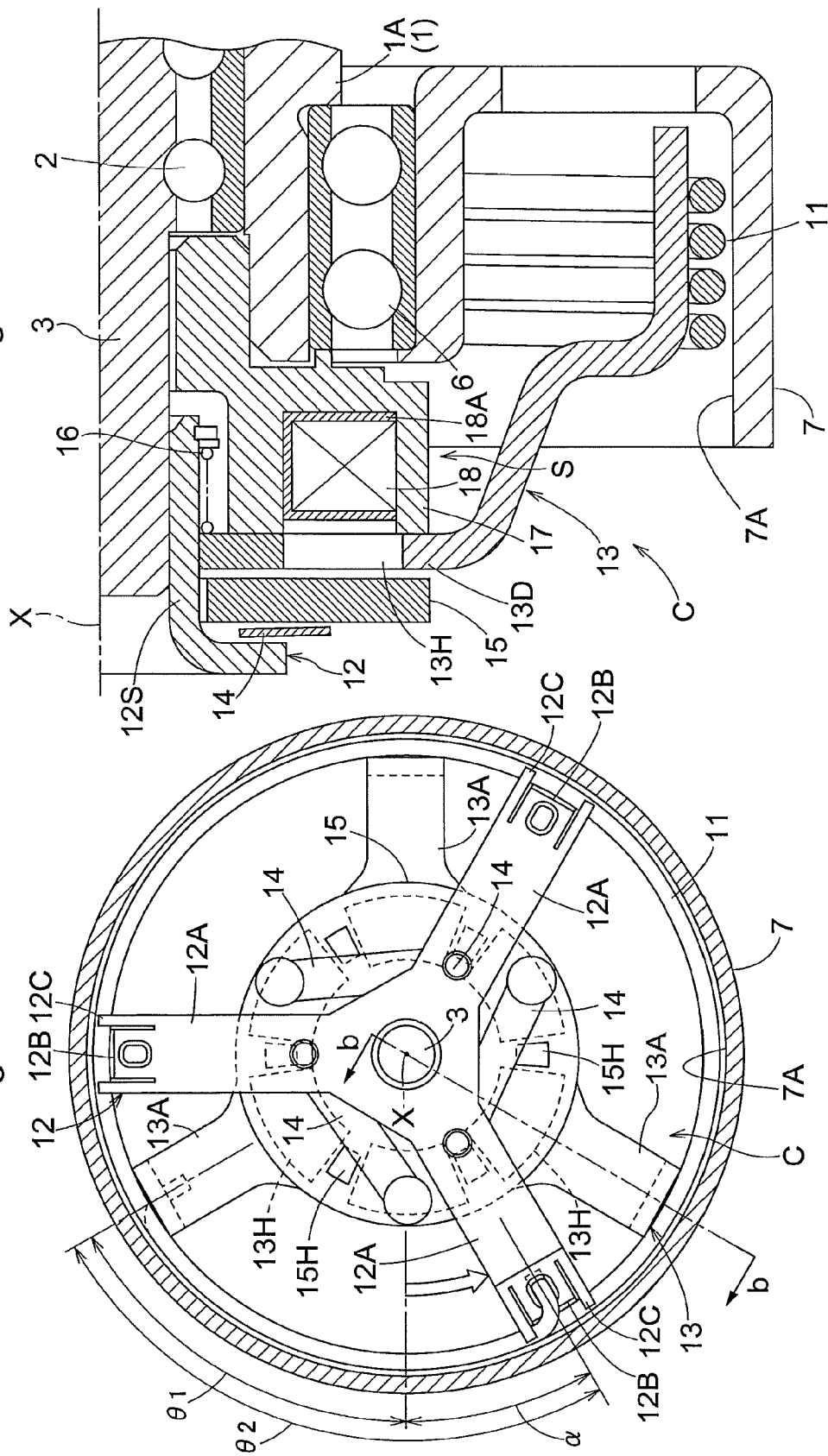

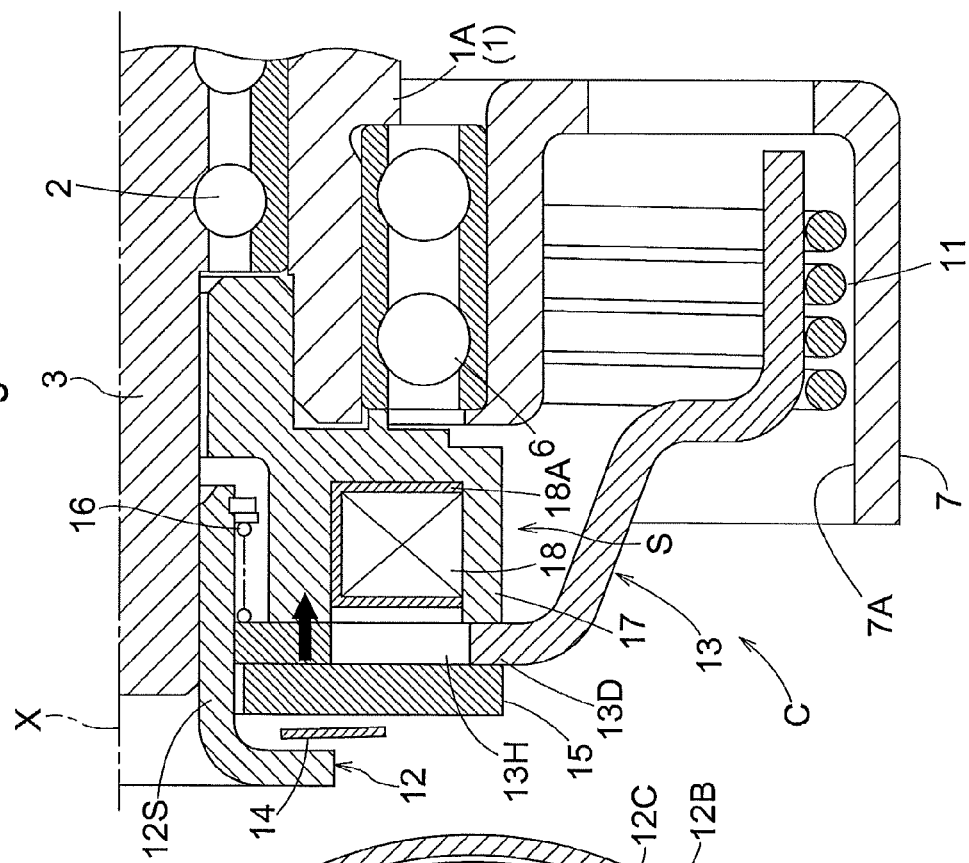
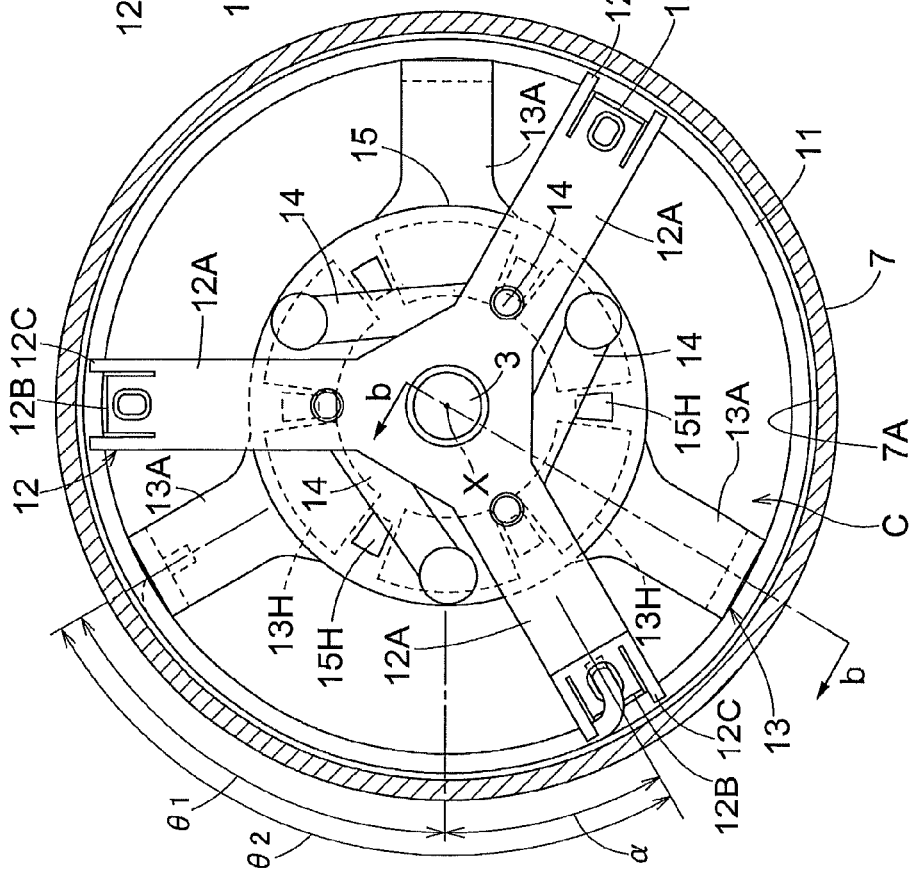
Fig.7A
Fig.7B

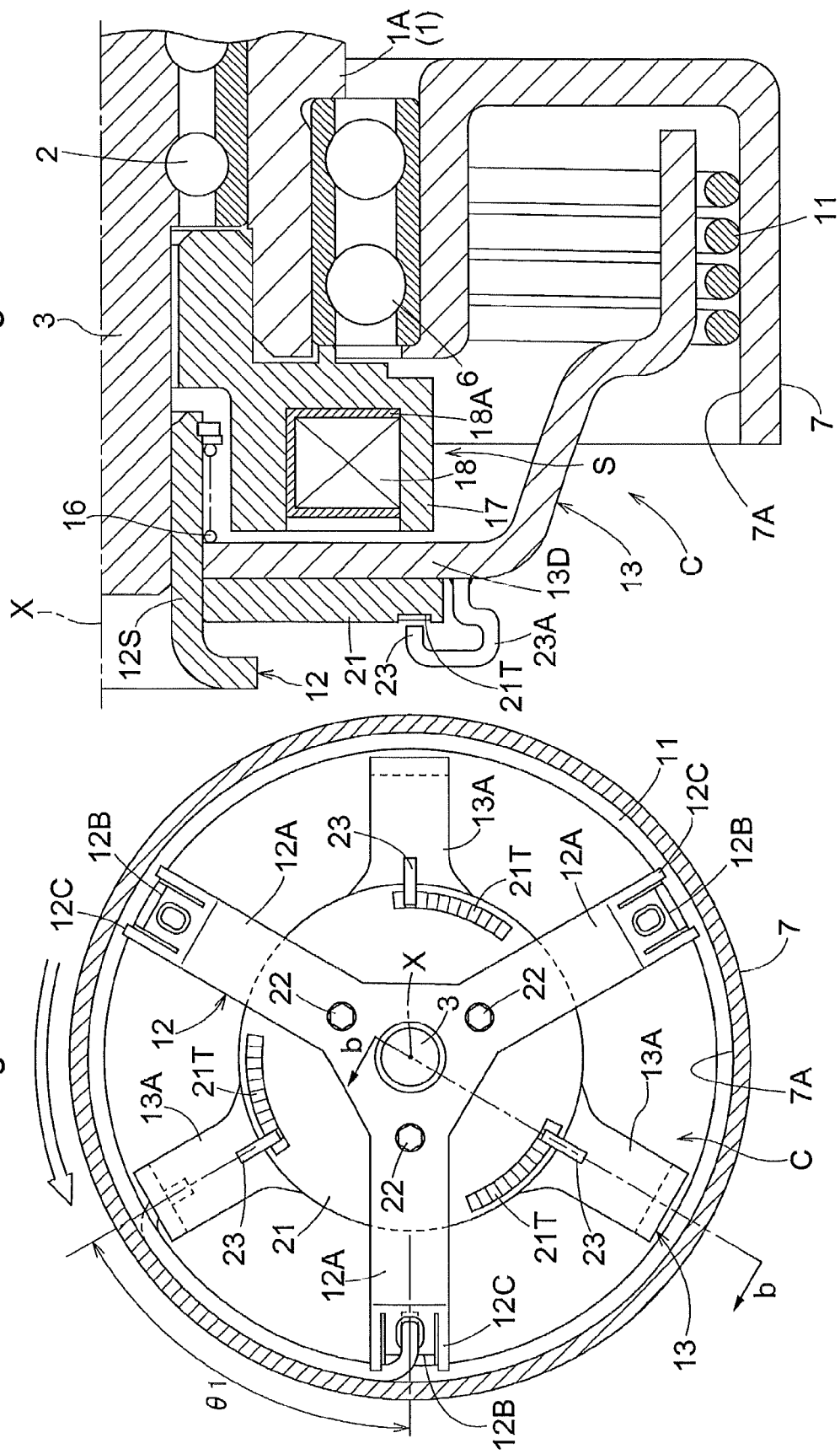

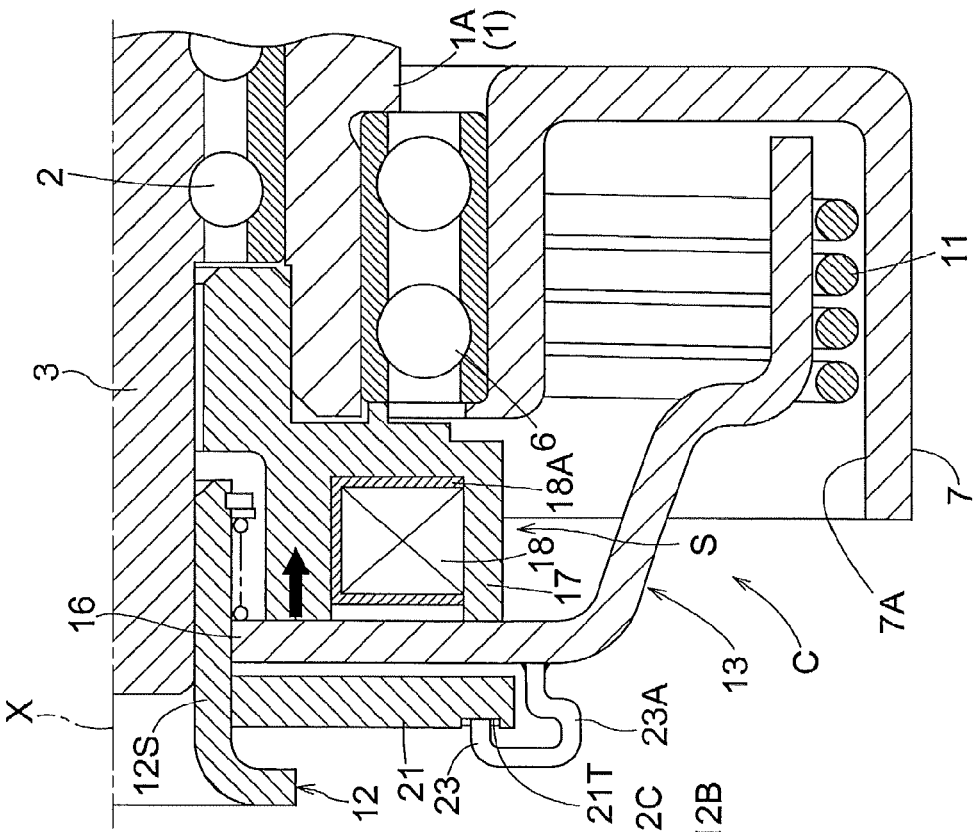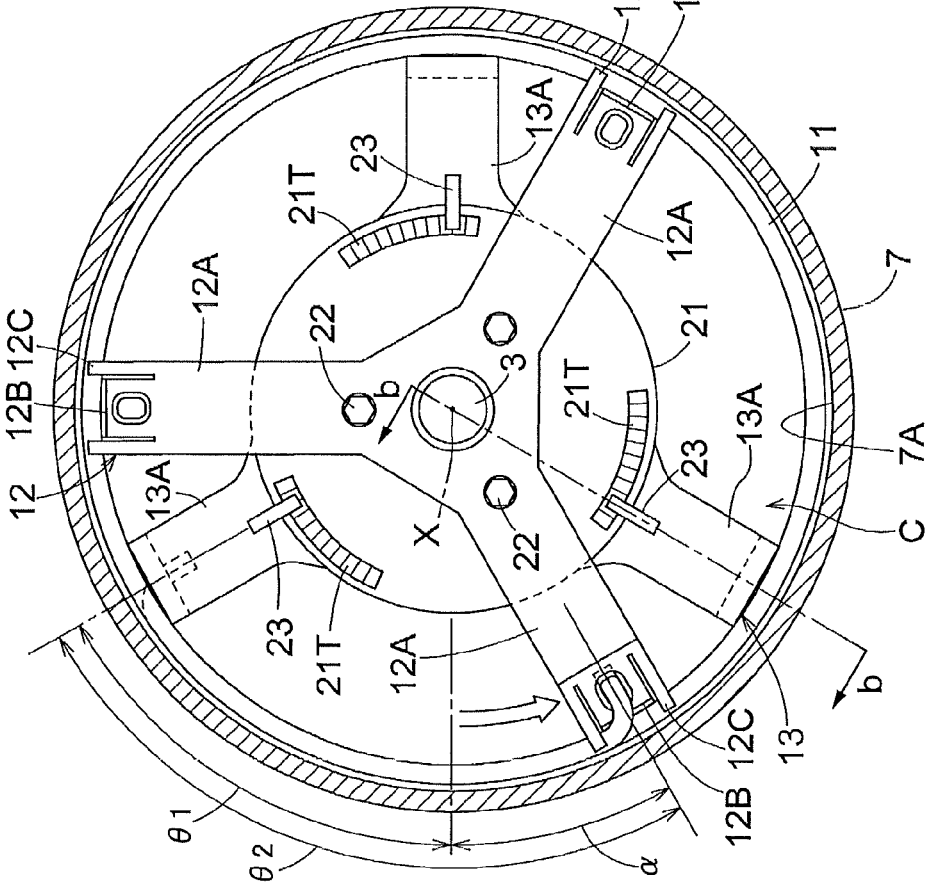

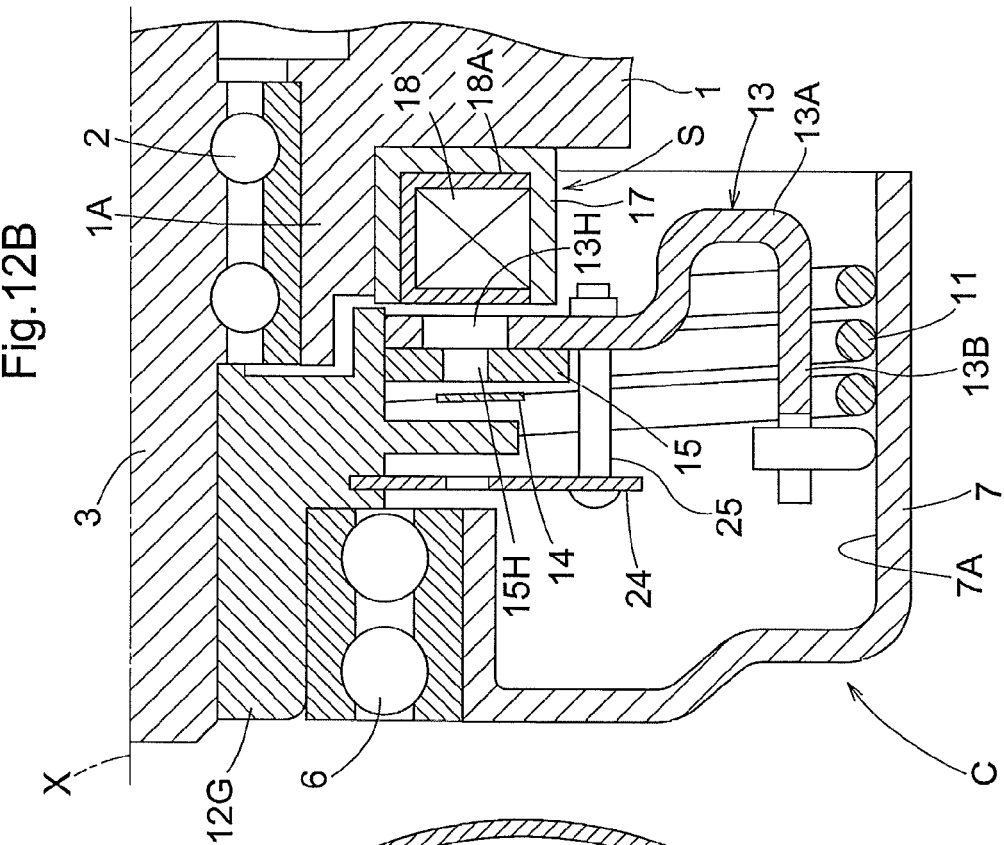
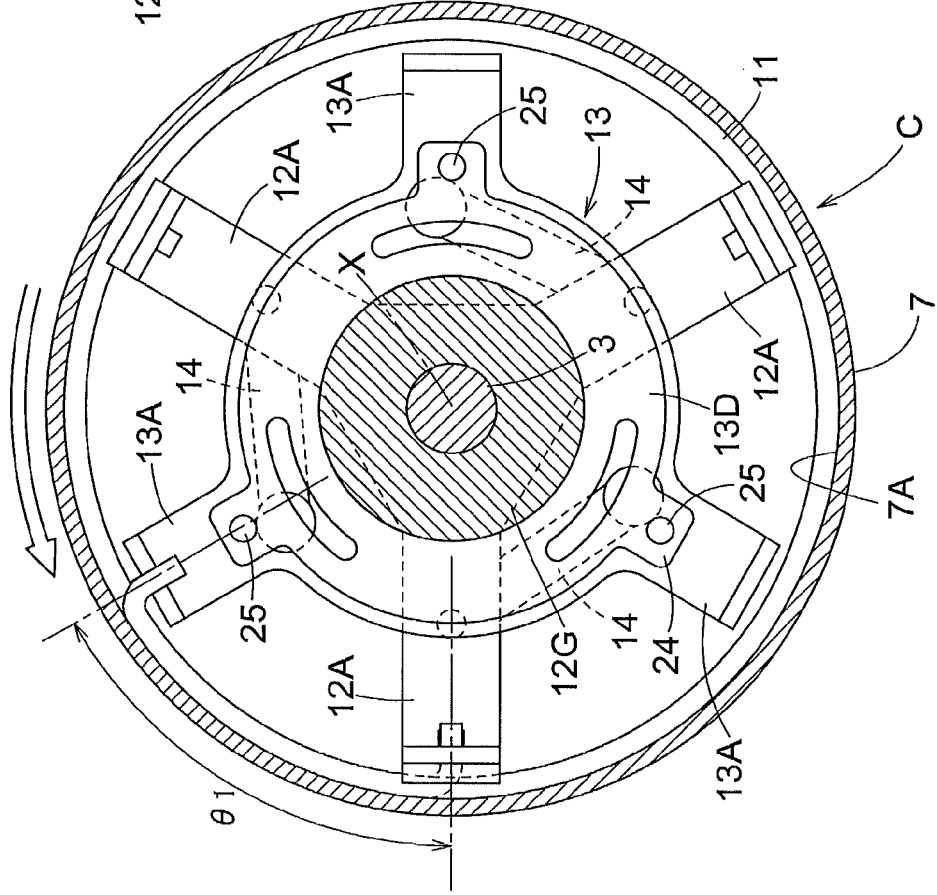

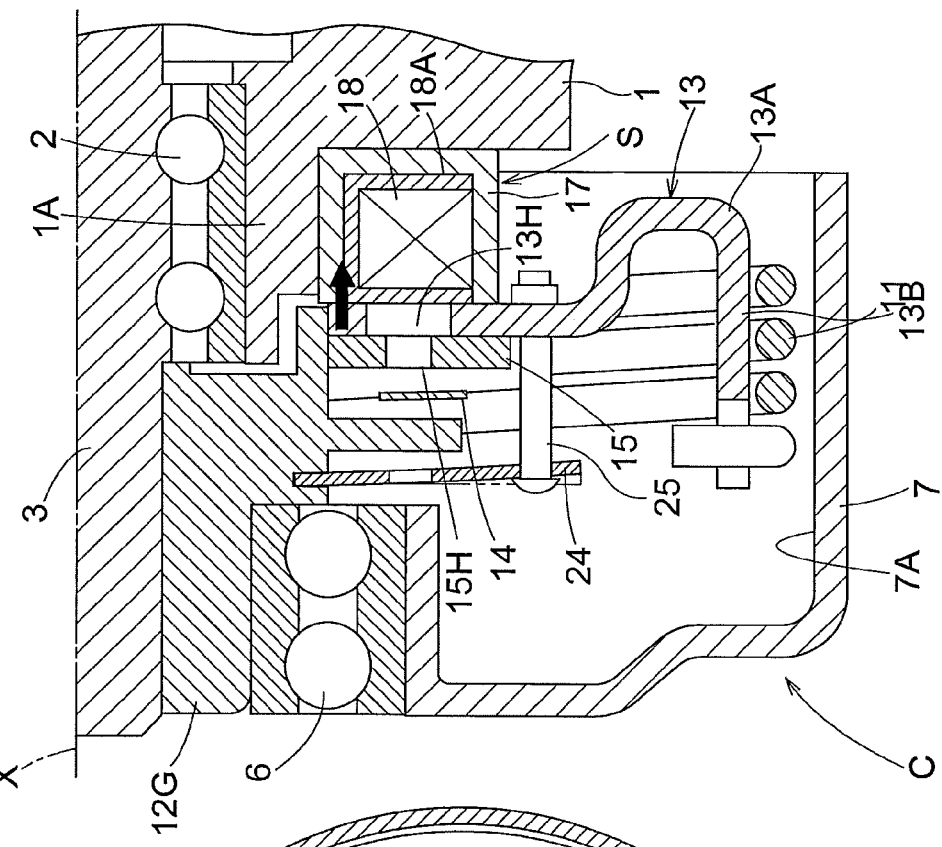
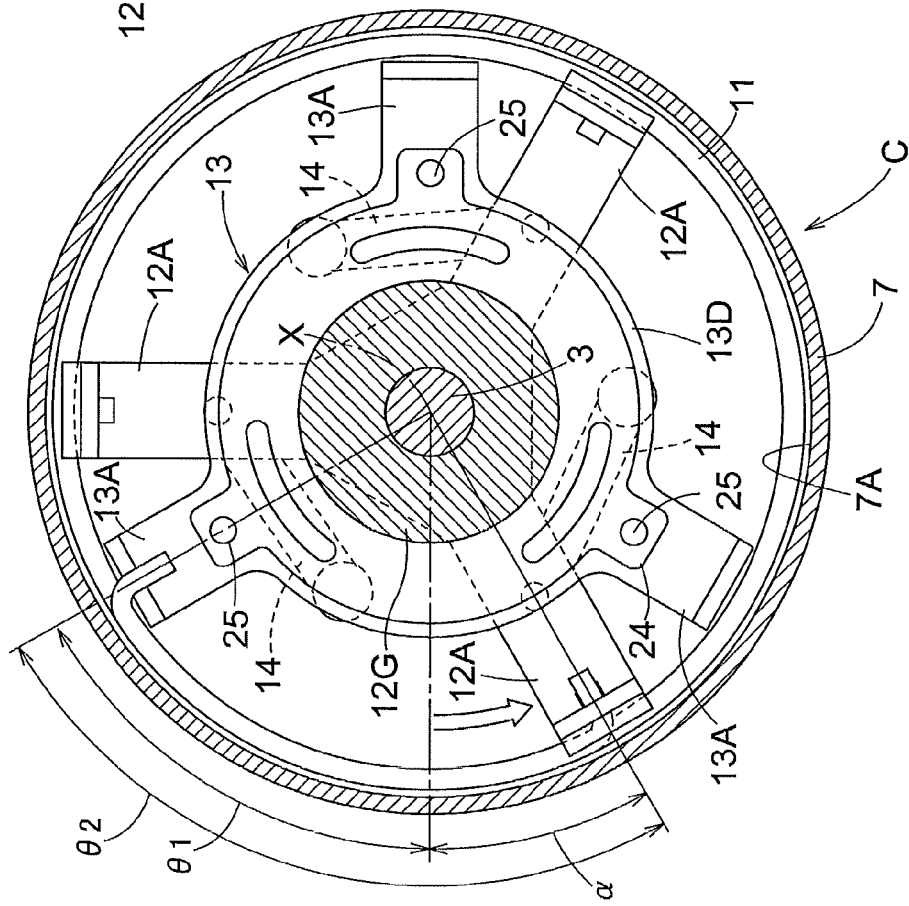
Fig.13A
Fig.13B

ELECTROMAGNETIC CLUTCH

TECHNICAL FIELD

The present invention relates to an electromagnetic clutch, and more particularly to an electromagnetic clutch including a driving rotary element and a driven rotary element mounted coaxially with a rotational axis, and a coiled wrap spring centering about the rotational axis to establish and break power transmission by changing a winding diameter of the wrap spring.

BACKGROUND ART

An example of the above-described conventional electromagnetic clutch is disclosed in Patent Document 1, in which a driving rotary element (a first element in Patent Document 1) and a driven rotary element (a second element in Patent Document 1) are provided adjacent to each other along a rotational axis to be rotatable coaxially with the rotational axis. A wrap spring is arranged in outer circumferences of the driving rotary element and the driven rotary element. A control collar is provided around the wrap spring. One end of the wrap spring is supported to the driving rotary element and the other end of the wrap spring is supported to the control collar.

According to Patent Document 1, a clutch-disengaging state is achieved when a magnetic force is not exerted on an armature provided in the control collar, in which the wrap spring is separated from the outer circumferences of the driving rotary element and the driven rotary element. When the magnetic force is exerted on the armature provided in the control collar to reduce a winding diameter of the wrap spring and bring the wrap spring into pressure contact with the outer circumferences of the driving rotary element and the driven rotary element, thereby to transmit a rotational driving force of the driving rotary element to the driven rotary element.

Meanwhile, Patent Document 2 discloses an arrangement including a driving rotary element (an input pulley in Patent Document 2), a driven rotary element (an output hub in Patent Document 2), and a wrap spring provided in outer circumferences of winding surfaces of the driving rotary element and the driven rotary element. One end of the wrap spring is supported to an armature, and the other end of the wrap spring is supported to the driven rotary element. An electromagnetic solenoid is mounted within the driving rotary element for exerting a drawing force on the armature.

According to Patent Document 2, a clutch-disengaging state is achieved when a magnetic force from the electromagnetic solenoid is not exerted on the armature, in which the wrap spring is separated from the outer circumferences of the input pulley and the output hub. When the magnetic force is exerted from the electromagnetic solenoid to the armature for drawing the armature, the wrap spring comes into tight contact with the outer circumferences of the input pulley and the output hub, thereby to transmit a driving force from the driving rotary element to the driven rotary element.

PRIOR ART DOCUMENT

Patent Document

Patent Document 1: Japanese Unexamined Patent Application Publication No. 11-201191
Patent Document 2: Japanese Unexamined Patent Application Publication No. 2001-317565.

SUMMARY OF INVENTION

As disclosed in Patent Document 1 and Patent Document 2, in the electromagnetic clutch configured to produce the transmission state by electrifying the electromagnetic solenoid, the electrification should be continued when power is transmitted, which causes a disadvantage of waste of electric power when such an electromagnetic clutch is used in a part such as a water pump in which the transmission state (clutch-engaging state) lasts for a long period of time. In particular, in order to continuously establish reliable power transmission in the electromagnetic clutch configured to maintain the transmission state by the electrification, the electromagnetic solenoid may be large so as to cope with decrease in magnetic flux caused by increase in temperature, as a result of which the costs would be increased. Further, if the electrification is cut off by malfunction, the water pump does not function, and thus an engine may be overheated.

Taking into the above disadvantages into consideration, it is desirable to provide an electromagnetic clutch using the wrap spring configured to achieve the transmission state (clutch-engaging state) when the electromagnetic solenoid is not electrified and break the power transmission when the electromagnetic solenoid is electrified (clutch-disengaging state).

Further, it should be noted that, in the electromagnetic clutch using the wrap spring, the armature or the like actuated by the electromagnetic solenoid is connected to one end of the wrap spring and thus only one end of the wrap spring is restrained when the electromagnetic solenoid is electrified. Therefore, an urging force continues to act on the other end of the wrap spring in a restoring direction.

Therefore, in order to provide the electromagnetic clutch switchable to the cutoff state by electrifying the electromagnetic solenoid, the one end of the wrap spring may be restrained to a stationary element when the electromagnetic solenoid is electrified, for example. In such an arrangement, however, the wrap spring is brought into contact with an element at the driving side (such as a driving rotary element) by a restoring force exerted on the other end of the wrap spring, which brings about useless abrasion and waste of energy. Thus, there is room for improvement.

Further, in the electromagnetic clutch disclosed in Patent Document 1, for example, since a friction ring is provided between the electromagnetic solenoid and the armature, a large air gap is produced in that part. As a result, strict dimension control of the air gap would be required in order to exert a sufficient drawing force on the armature from the electromagnetic solenoid. In addition, a strong drawing force should be exerted on the armature, which may lead to a large-capacity electromagnetic solenoid. As a result, the entire electromagnetic clutch may easily become large and thus should desirably be miniaturized.

The object of the present invention is to provide a practical electromagnetic clutch using a wrap spring for achieving a cutoff state when an electromagnetic solenoid is switched from a non-electrified state to an electrified state and suppressing abrasion of the wrap spring and waste of energy in the cutoff state.

A characteristic feature of the present invention lies in an electromagnetic clutch comprising a driving rotary element and a driven rotary element mounted coaxially with a rotational axis; a coiled wrap spring centering about the rotational axis; and a control mechanism for switching the electromagnetic clutch between a transmission state for bring the wrap spring into pressure contact with the driving rotary element by changing a winding diameter of the wrap spring to transmit a rotational force of the driving rotary element to the driven rotary element, and a cutoff state for decreasing the pressure contact force of the wrap spring against the driving rotary element thereby to cut off the rotational force transmitted to the driven rotary element, wherein the control mechanism includes a driving element connected to one end of the wrap spring to be rotatable in unison with the driven rotary element, an operating element made of magnetic material and connected to the other end of the wrap spring to be rotatable about the rotational axis, and an electromagnetic solenoid supported to a stationary element for attracting the operating element to restrain the operating element, and the control mechanism further includes restraint mechanism for allowing rotation of the driving element caused by dynamic inertia after the operating element is restrained by the attraction of the electromagnetic solenoid in the transmission state to achieve a rotational phase in which the driving rotary element is brought to the cutoff state and then restraining the driving element.

With the above-described arrangement, when the electromagnetic clutch is in the non-electrified state, the wrap spring comes into pressure contact with the driving rotary element to allow the electromagnetic clutch to be in the transmission state (clutch-engaging state), in which the rotational driving force is transmitted to the driven rotary element from the driving element connected to the one end of the wrap spring. When the electromagnetic clutch achieves the electrified state, the operating element is attracted to the electromagnetic solenoid and restrained in rotation. The driving rotary element is rotated by the dynamic inertia after the operating element is restrained to change the winding diameter of the wrap spring, thereby to achieve the cutoff state (clutch-disengaging state) for moving the wrap spring away from the contact surface of the driving rotary element. Then, the restraint mechanism restrains the driving element. In this manner, since the one end of the wrap spring is restrained by the restraint mechanism to inhibit the winding diameter of the wrap spring from restoring after the other end of the wrap spring is restrained by the stationary element and the cutoff state is achieved, it becomes possible to keep the wrap spring away from the driven rotary element. Further, since the operating element is attracted to the electromagnetic solenoid when electrified, no air gap is produced unlike the arrangement in which magnetic flux from the electromagnetic solenoid is exerted on the operating element through the air gap in the electrified state. Thus, the electromagnetic solenoid does not need large capacity, and can be miniaturized.

As a result, the electromagnetic clutch capable of restraining abrasion of the wrap spring and waste of energy can be miniaturized in which the electromagnetic solenoid is switched from the non-electrified state to the electrified state to move the wrap spring away from the driving rotary element to achieve the cutoff state, thereby to maintain the state in which the wrap spring is moved away from the driving rotary element.

The electromagnetic clutch according to the present invention may have the configuration in which the driven rotary element is formed as a shaft, the operating element is mounted on the shaft to be relatively rotatable and displaceable along the rotational axis, an armature made of magnetic material is provided to face the electromagnetic solenoid across the operating element to be rotatable in unison with the shaft and displaceable along the rotational axis, and the restraint mechanism includes the operating element and the armature, in which a main aperture is formed in a surface of the operating element for attracting the electromagnetic solenoid and an auxiliary aperture is formed in a surface of the armature on which magnetic flux from the operating element is exerted, the main aperture and the auxiliary aperture achieving a positional relationship to allow a drawing force exerted on the armature to increase when the rotational phase in which the driving rotary element is brought to the cutoff state is achieved after the operating element is attracted to the electromagnetic solenoid and then attract and restrain the armature to the operating element by the increased drawing force.

With the above-described arrangement, since the main aperture is formed in the operating element, it is possible that leakage flux is produced from the main aperture of the operating element when the operating element is attracted to the electromagnetic solenoid to exert the leakage flux on the armature. Further, due to the auxiliary aperture formed in the armature, magnetic resistance is increased and the attracting force is decreased in the area where the auxiliary aperture is formed, while the magnetic resistance is small and the attracting force is increased in the area where the auxiliary aperture is not formed. In this, after the electromagnetic solenoid is electrified and the operating element is attracted to the electromagnetic solenoid, the drawing force exerted from the operating element to the armature can be restrained during the initial stage of rotation of the driving element caused by the dynamic inertia, and then the drawing force exerted on the armature can be increased when the rotational phase in which the driving rotary element is brought to the cutoff state is achieved to attract and restrain the armature to the operating element with the wrap spring being moved away from the driven rotary element.

The electromagnetic clutch according to the present invention may have the configuration in which the driven rotary element is formed as a shaft, the operating element is mounted on the shaft to be relatively rotatable and displaceable along the rotational axis, urging mechanism is provided for urging the operating element in a direction to move the operating element away from the electromagnetic solenoid, a lock element is connected to the shaft to face the electromagnetic solenoid across the operating element, and the restraint mechanism includes the lock element, and further includes an engaging part having engaging teeth formed in the lock element, and an engaging pawl engageable with the engaging part for allowing rotation of the lock element caused by the dynamic inertia when the operating element is attracted to the electromagnetic solenoid and preventing rotation in a direction to prevent the rotation of the lock element caused by an urging force of the wrap spring.

With the above-noted arrangement, when the electromagnetic solenoid is electrified, the operating element is displaced against the urging force of the urging mechanism to be attracted to the electromagnetic solenoid. When the operating element is displaced in this manner, the engaging pawl is displaced to the position to be engageable with the engaging teeth of the engaging part of the lock element. With this state, the engaging pawl is engaged with the engaging teeth of the engaging part. The engaging part and the engaging pawl allow the rotation of the driving element caused by the dynamic inertia, while preventing the rotation of the lock element caused by the urging force of the wrap spring. Thus, the lock element can be restrained with the wrap spring being moved away from the driven rotary element.

The electromagnetic clutch according to the present invention may have the configuration in which the driving rotary element has a cylindrical inner surface, and the wrap spring comes into pressure contact with the inner surface in a natural state.

With the above-described arrangement, when a pulley is used as the driving rotary element, for example, it is possible to provide the electromagnetic clutch using the cylindrical inner surface of the pulley and having the wrap spring coming into contact with the inner surface in the natural state.

The electromagnetic clutch according to the present invention may have the configuration in which the driving element includes a driving arm extending radially from the rotational axis, the driving arm has a retainer piece at an extreme end thereof, the retainer piece extending in a direction parallel to the rotation axis, the operating element includes an operating arm extending radially from the rotational axis, the operating arm has a connecting piece at en extreme end thereof, the connecting piece extending in the direction parallel to the rotational axis, and the retainer piece is connected to the one end of the wrap spring while the connecting piece is connected to the other end of the wrap spring.

The electromagnetic clutch according to the present invention may have the configuration in which the driving rotary element has a cylindrical portion, and at least one of the driving arm and the operating arm is housed within the cylindrical portion.

The electromagnetic clutch according to the present invention may have the configuration in which the driving rotary element has a cylindrical portion, and the armature is housed within the cylindrical portion.

The electromagnetic clutch according to the present invention may have the configuration in which the retainer piece is provided with limiter pieces for limiting expansion of the wrap spring in the direction parallel to the rotational axis.

The electromagnetic clutch according to the present invention may have the configuration in which the limiter pieces project toward the wrap spring.

The electromagnetic clutch according to the present invention may have the configuration in which the limiter pieces are provided in opposite sides of the wrap spring in the direction parallel to the rotational axis.

The electromagnetic clutch according to the present invention may have the configuration in which the operating element is attracted to the electromagnetic solenoid with the auxiliary aperture being positioned within an area of the main aperture and then the auxiliary aperture is moved out of the area of the main aperture, thereby to increase the drawing force exerted on the armature to attract the armature to the operating element.

The electromagnetic clutch according to the present invention may have the configuration in which the driving element is provided to face the operating element across the armature in the direction parallel to the rotational axis, the armature is connected to the driving element through a resilient element, thereby to transmit a rotational force of the driving element to the armature and to urge the armature in a direction to move the armature away from the electromagnetic solenoid, the drawing force of the solenoid exerted on the armature with the auxiliary aperture being positioned within the area of the main aperture is smaller than an urging force of the resilient element, and the drawing force of the solenoid exerted on the armature with the auxiliary aperture being positioned out of the area of the main aperture is greater than the urging force of the resilient element.

The electromagnetic clutch according to the present invention may have the configuration in which the engaging teeth are formed in arc areas centering about the rotational axis in a surface of the lock element facing away from the operating element.

The electromagnetic clutch according to the present invention may have the configuration in which the engaging teeth are formed in an outer circumference of the lock element.

BRIEF DESCRIPTION OF DRAWINGS

FIG. 4A is a front view of the electromagnetic clutch in a transmission state;

FIG. 4B is a sectional view taken on line b-b of FIG. 4A;

FIG. 5A is a front view of the electromagnetic clutch with an operating element being attracted to an electromagnetic solenoid;

FIG. 5B is a sectional view taken on line b-b of FIG. 5A;

FIG. 6A is a front view of the electromagnetic clutch with a driving member being rotated by dynamic inertia;

FIG. 6B is a sectional view taken on line b-b of FIG. 6A;

FIG. 7A is a front view of the electromagnetic clutch with an armature being attracted to the operating element;

FIG. 7B is a sectional view taken on line b-b of FIG. 7A;

FIG. 9A is a front view of the electromagnetic clutch in the transmission state in the modified embodiment (a);

FIG. 9B is a sectional view taken on line b-b of FIG. 9A;

FIG. 10A is a front view of the electromagnetic clutch with an operating element being attracted to an electromagnetic solenoid in a modified embodiment (b);

FIG. 10B is a sectional view taken on line b-b of FIG. 10A;

FIG. 12A is a front view of the electromagnetic clutch in the transmission state in the modified embodiment (b);

FIG. 12B is a partial sectional view of FIG. 12A;

FIG. 13A is a front view of the electromagnetic clutch with the armature being attracted to the operating element in the modified embodiment (b);

FIG. 13B is a partial sectional view of FIG. 13A; and

DESCRIPTION OF EMBODIMENTS

Figure 1:
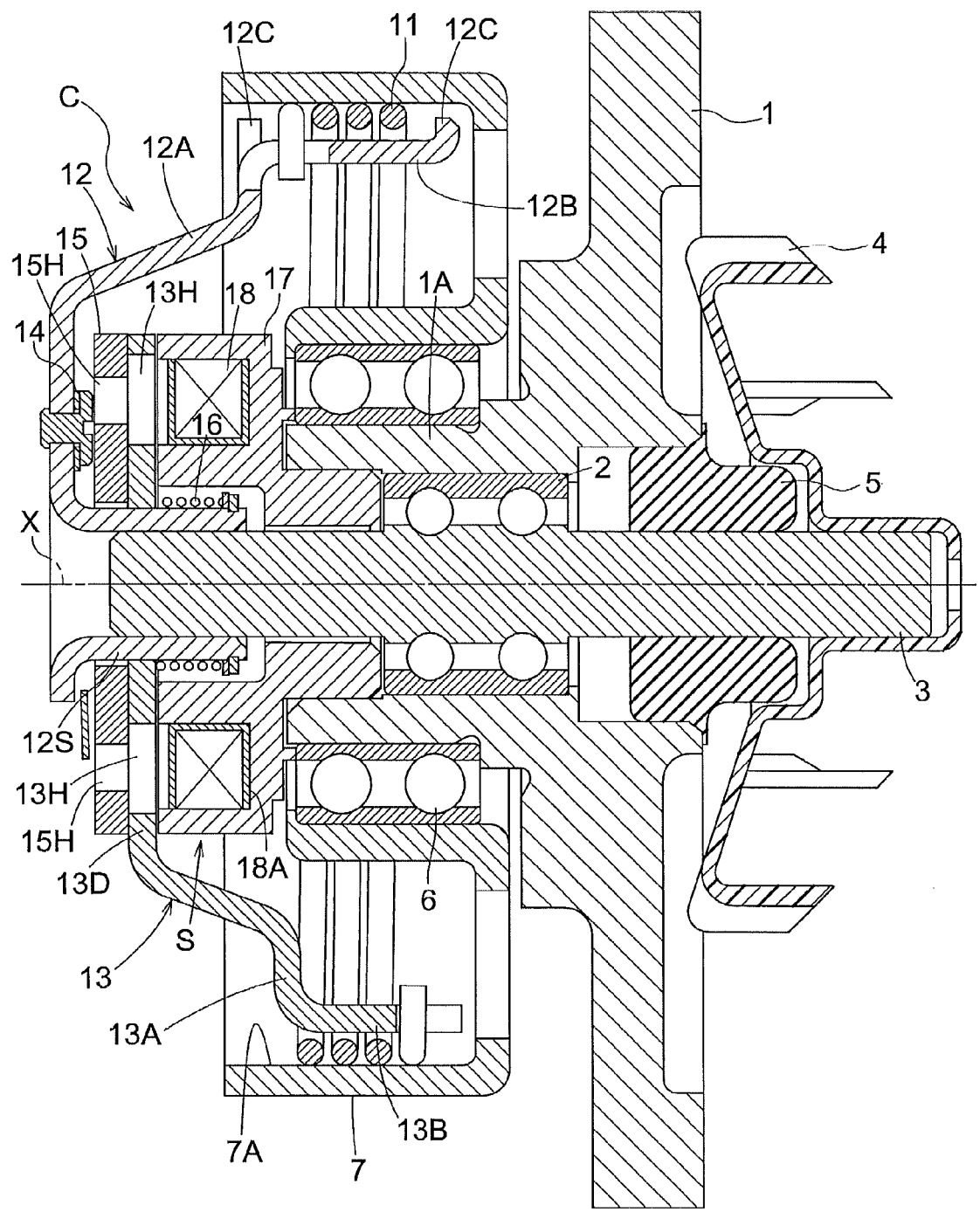
FIG. 1 is a sectional view of a water pump including an electromagnetic clutch.
Figure 2:
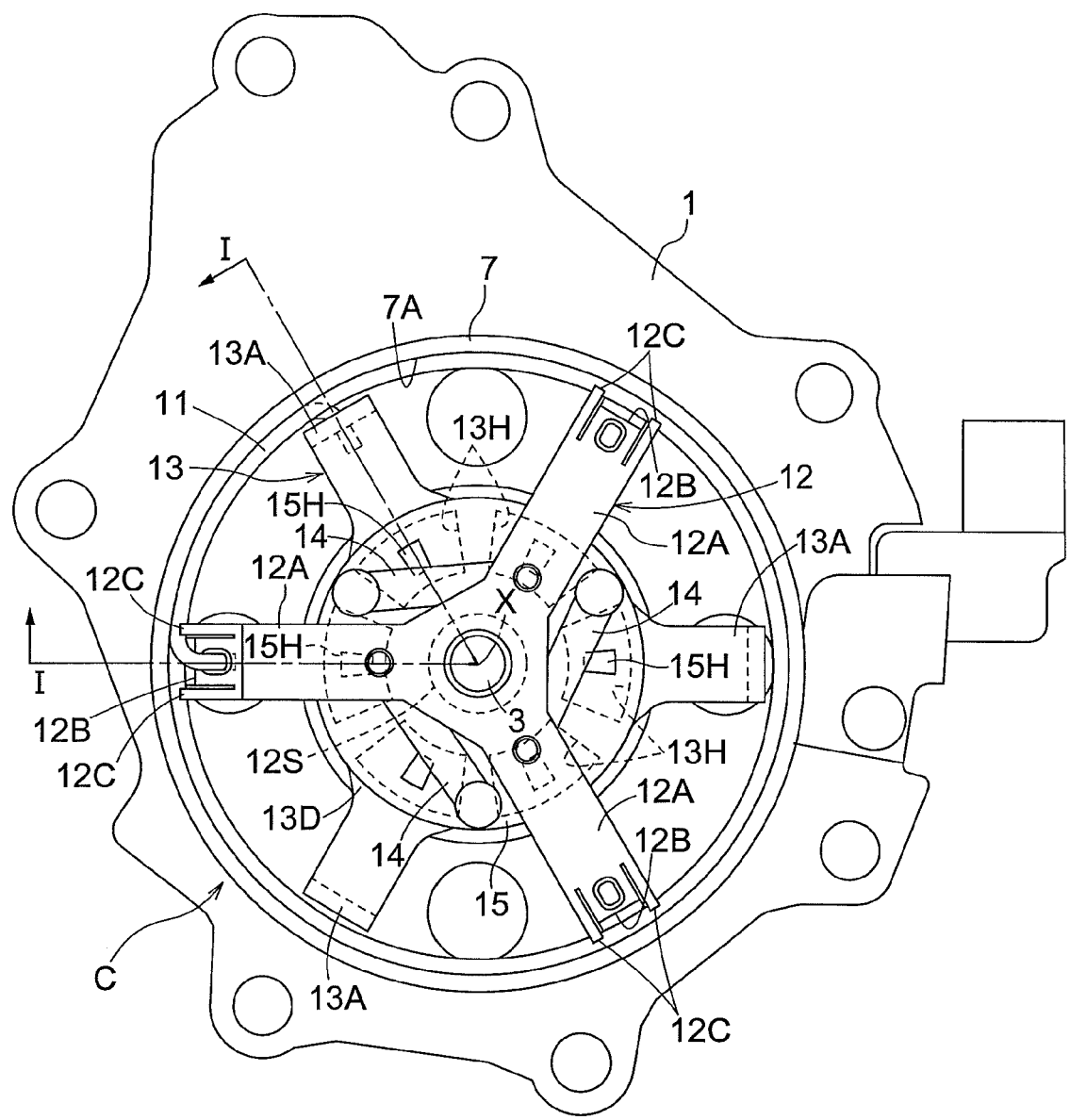
FIG. 2 is a front view of the electromagnetic clutch.
Figure 3:
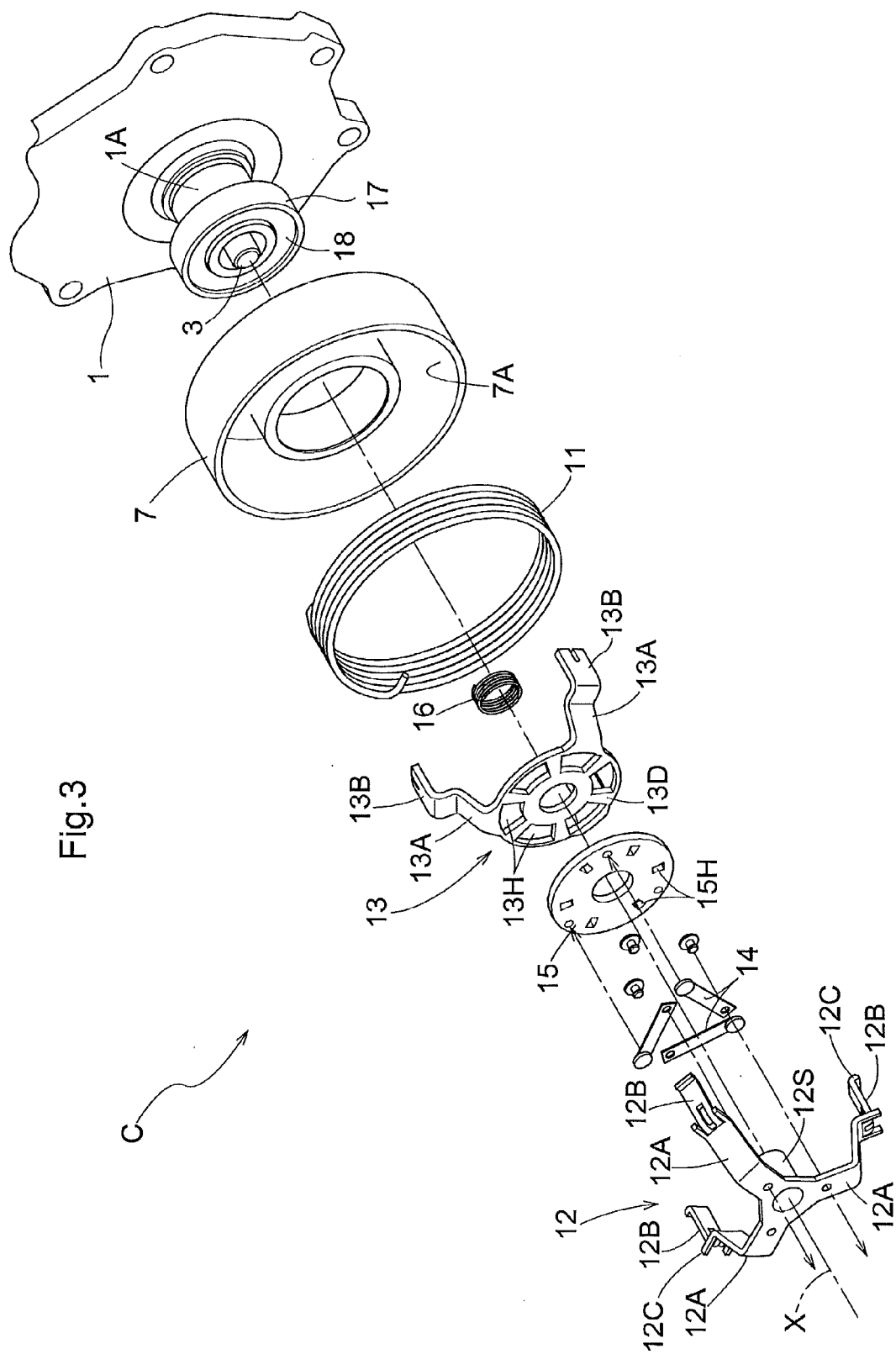
FIG. 3 is an exploded perspective view of the electromagnetic clutch.

Embodiments of the present invention will be described hereinafter in reference to the accompanying drawings.
[Overall Configuration]
FIGS. 1 to 3 show a water pump for transmitting and blocking power through an electromagnetic clutch C according to the present invention. FIG. 1 is a sectional view of the water pump taken on line I-I of FIG. 2. The water pump includes a pump housing 1 acting as a stationary element for supporting a shaft 3 (an example of a driven rotary element) to be rotatable about an rotational axis X through a shaft bearing 2, an impeller 4 mounted on an inner end of the shaft 3, a seal 5 disposed between the shaft 3 and the pump housing 1, and an input pulley 7 (an example of a driving rotary element) mounted on a boss portion 1A of the pump housing 1 through a pulley bearing 6 to be rotatable about the rotational axis X. The electromagnetic clutch C is switchable between a transmission state for transmitting a rotational driving force of the input pulley 7 to the shaft 3 (clutch-engaging state) and a cutoff state for blocking the rotational drive force of the input pulley 7 (clutch-disengaging state).

During use of the water pump, an endless belt is wound around an output pulley (not shown) mounted on an output shaft of an engine (not shown) and the input pulley 7 of the water pump, and thus the input pulley 7 is constantly driven. The electromagnetic clutch C is controlled through a controller (not shown) that acquires detecting results from a temperature sensor (not shown) for detecting temperature of cooling water. The controller is configured to set the electromagnetic clutch C to the cutoff state when it is determined that the temperature of the cooling water is low like when immediately after the engine is started (that is, a warm-up is not sufficient) to accelerate the warm-up, and to set the electromagnetic clutch C to the transmission state when it is determined that the temperature of the engine is raised to a proper level to circulate the cooling water by driving the impeller 4.

[Electromagnetic Clutch]

The electromagnetic clutch C includes a coiled wrap spring 11 housed in the input pulley 7, a driving element 12, an operating element 13, an armature 15, and an electromagnetic solenoid S for exerting a drawing force to the operating element 13 to attract the same. The driving element 12 supports one end of the wrap spring 11 and fitted on an outer end of the shaft 3. The operating element 13 supports the other end of the wrap spring 11 and is rotatably mounted on an outer end of a sleeve 12S rotatable in unison with the shaft 3. The armature 15 is disposed between the operating element 13 and the driving element 12, and is supported to the driving element 12 through a flat spring 14 to be rotatable in unison with the driving element 12.

A yoke 17 made of magnetic material is partially fitted into the boss portion 1A of the pump housing 1, and has a recess that is annular coaxially with the rotational axis X to be open to a direction opposite to the impeller 4. A coil 18 formed of a copper wire wound around a bobbin 18A is inserted into the recess of the yoke 17 to constitute the electromagnetic solenoid S. Attraction surfaces are formed in annular areas centering about the rotational axis X in an inner side and an outer side of the recess of the yoke 17 for receiving the coil 18. The wrap spring 11 is made of spirally-formed spring steel with a winding diameter to allow the spring to come into pressure contact with a cylindrical inner surface 7A of the input pulley 7 in a natural state (in which no external force is exerted).

The driving element 12 has three arms 12A radially extending from the sleeve 12S fixedly fitted on the shaft 3 by pressure bonding. The one end of the wrap spring 11 is supported to one of the three arms 12A. The three arms 12A have retainer pieces 12B at extreme ends thereof. Each of the retainer pieces 12B extends in a direction parallel to the rotational axis X and one of the retainer pieces 12B is connected to the one end of the wrap spring 11. Limiter pieces 12C are formed in opposite ends of each retainer piece 12B for limiting expansion of the wrap spring 11 in the direction parallel to the rotational axis X. While the driving element 12 requires only one arm for supporting the one end of the wrap spring 11, the three arms 12A are provided for keeping rotational balance.

The operating element 13 is a unit including a disk element 13D made of magnetic material and having an outer diameter equal to an outer circumference of the attraction surface of the yoke 17, and three operating arms 13A radially extending from an outer circumference of the disk element 13D and integrally formed with the disk element. The sleeve 12S of the driving element 12 is inserted into a through bore formed in the center of the disk element 13D to allow the operating element 13 to be rotatable relative to the sleeve 12S and movable in the direction along the rotational axis X. The other end of the wrap spring 11 is supported to one of the three operating arms 13A. The three operating arms 13A have connecting pieces 13B at extreme ends thereof. Each of the connecting pieces 13B extends in the direction parallel to the rotational axis X and one of the connecting pieces 13B is connected to the one end of the wrap spring 11. While the operating element 13 requires only one arm for supporting the other end of the wrap spring 11 in the similar manner to the driving element 12, the three arms 13A are provided for keeping rotational balance. In addition, a coil spring 16 is mounted on an outer circumference of the sleeve 12S to allow the operating arms 13A to be moved away from the yoke 17 by an urging force exerted from the coil spring 16.

The armature 15 is a disk made of magnetic material and having an outer diameter equal to the outer circumference of the attraction surface of the yoke 17. The driving element 12 is mounted to face the operating element 13 across the armature 15 in the direction parallel to the rotational axis X. The armature 15 and the three driving arms 12A of the driving element 12 are connected through the flat springs (resilient elements) 14 (three flat springs 14 all told) to allow the armature 15 to be rotatable in unison with the sleeve 12S and movable along the rotational axis X. More particularly, the rotational force of the driving element 12 is transmitted to the armature 15 through the three flat springs 14, and the armature 15 is maintained in a position remote from the operating element 13 with no external force being exerted and is displaced toward the operating element 13 along the rotational axis X by resilient deformation of the three flat springs 14 when the drawing force caused by a magnetic force is exerted from the operating element 13.

In the electromagnetic clutch C of the present invention, the transmission state (clutch-engaging state) is achieved when the driving arms 12A of the driving element 12 and the operating arms 13A of the operating element 13 are maintained in a relative position shown in FIG. 4A to bring the wrap spring 11 into pressure contact with the inner surface 7A of the input pulley 7. Conversely, the cutoff state (clutch-disengaging state) is achieved when the driving arms 12A of the driving element 12 and the operating arms 13A of the operating element 13 are moved to a relative position shown in FIG. 7A to allow the wrap spring 11 to move away from the inner surface 7A of the input pulley 7. It should be noted that it is not required that the wrap spring 11 be completely separated from the inner surface 7A of the input pulley 7 in the cutoff state. For example, the electromagnetic clutch C of the present invention may be configured to break the power transmission between the input pulley 7 and the shaft 3 when a pressure-contact force applied to the inner surface 7A of the input pulley 7 from the wrap spring 11 decreases. In such a case, the wrap spring 11 is in light contact with the inner surface 7A of the input pulley 7.

In particular, the electromagnetic clutch C provides a control mechanism constituted by the driving element 12 and the operating element 13, and has restraint mechanism for maintaining the cutoff state by setting the driving arms 12A of the driving element 12 and the operating arms 13A of the operating element 13 to the relative position shown in FIG. 7A.

[Electromagnetic Clutch: Restraint Mechanism]

The operating element 13 and the armature 15 constitute the restraint mechanism.

As shown in FIG. 3 and FIG. 4A, while a plurality of main apertures 13H are circumferentially formed in the disk 13D of the operating element 13, a plurality of auxiliary apertures 15H are circumferentially formed in the armature 15. The main apertures 13H and the auxiliary apertures 15H serve to set the driving arms 12A of the driving element 12 and the operating arms 13A of the operating element 13 to the relative position shown in FIG. 7A when the electromagnetic clutch C is operated to the cutoff state. The action of the restraint mechanism will be described below. While six main apertures 13H and six auxiliary apertures 15H are shown, the number of those apertures is not limited to six but may be selected desirably.

When the electromagnetic solenoid S is not electrified, the disk 13D of the operating element 13 is moved away from the yoke 17 of the electromagnetic solenoid S by the urging force of the coil spring 16 to form a clearance between the disk 3D and the yoke 17 as shown in FIG. 4B. In such a state, the wrap spring 11 comes into contact with the inner surface 7A of the input pulley 7 by its own urging force (toward a radius-increasing direction) to maintain the driving arms 12A of the driving element 12 and the operating arms 13A of the operating element 13 in the relative position shown in FIG. 4A. As a result, the rotational driving force is transmitted from the driving element 12 connected to the wrap spring 11 to the shaft 3, thereby to maintain the electromagnetic clutch C in the transmission state.

In the transmission state, a relative angle between each driving arm 12A and each operating arm 13A maintains a transmission angle θ1 to establish a relative positional relationship in which the auxiliary apertures 15H are positioned within the main apertures 13H in the direction along the rotational axis X as shown in FIG. 4A.

Next, when the coil 18 of the electromagnetic solenoid S is electrified, the disk 13D of the operating element 13 is attracted to the electromagnetic solenoid S (attraction surface of the yoke 17) against the urging force of the coil spring 16, as a result of which the operating element 13 is restrained. When the disk 13D is attracted in this manner, the auxiliary apertures 15H are present in an inner area of the main apertures 13H as viewed from the direction along the rotational axis X as shown in FIG. 5A. In this positional relationship, since the auxiliary apertures 15H act as magnetic resistance, a density of magnetic-flux flowing from the main apertures 13H to the armature 15 is limited by the auxiliary apertures 15H. In the electromagnetic clutch C of the present invention, a relationship is established so that the drawing force acting on the armature 15 becomes smaller than the urging force acting for moving the armature 15 from the three flat springs 14 due to the restricted magnetic-flux density, as a result of which the armature 15 is not attracted to the operating element 13.

After the rotation of the operating element 13 is restrained, the driving element 12 continues to rotate in a direction shown in an arrow in FIG. 5A by dynamic inertia. The rotational force of the driving element 12 reduces the winding diameter of the wrap spring 11 and then moves the wrap spring 11 away from the inner surface 7A of the input pulley 7 as shown in FIGS. 6A and 6B. When the driving element 12 is rotated by dynamic inertia in this manner, the state in which the auxiliary apertures 15H are present within the inner area of the main apertures 13H as viewed from the direction along the rotational axis X is maintained. In this, the drawing force acting on the armature 15 is not increased, which prevents the armature 15 from being attracted to the operating element 13 as shown in FIG. 6B.

With such rotation, the auxiliary apertures 15H are moved to an external area of the main apertures 13H (where no apertures are present) as viewed from the direction along the rotational axis X as shown in FIGS. 6A and 7A to allow the relative angle between each driving arm 12A of the driving element 12 and each operating arm 13A of the operating element 13 to reach a cutoff angle θ2. When the relative angle reaches the cutoff angle θ2, the armature 15 is displaced along the rotational axis X and attracted to the operating element 13 as shown in FIG. 7B. More particularly, in this positional relationship, magnetic resistance exerted on the magnetic flux flowing from the main apertures 13H to the armature 15 acting as leakage flux becomes a minimum value, and the density of magnetic flux flowing to the armature 15 is intensified to increase the drawing force. Then, the drawing force acting on the armature 15 becomes greater than the urging force acting for moving the armature 15 from the three flat springs 14, as a result of which the armature 15 is attracted to the operating element 13.

In achieving the cutoff state, the relative angle between the operating arm 13A and the driving arm 12A is changed only by a changing angle α, and the auxiliary apertures 15H are also shifted by the changing angle α relative to the main apertures 13 to allow the auxiliary apertures 15H to reach the area where no main apertures 13H are present, as a result of which the armature 15 is attracted to the operating element 13.

In this manner, the armature 15 is attracted to the operating element 13 to restrain the rotation of the driving element 12, and the relative position between the driving arms 12A of the driving element 12 and the operating arms 13A of the operating element 13 is maintained in the relationship shown in FIG. 7B against the urging force (toward the radius-increasing direction) of the wrap spring 11. This allows the wrap spring 11 to move away from the inner surface 7A of the input pulley 7 to produce the complete cutoff state. In the cutoff state, the rotational driving force of the input pulley 7 is not transmitted to the impeller 4, and water supply by the water pump is also stopped.

Then, the electric flow to the electromagnetic solenoid S is intercepted to allow the armature 15 to move away from the operating element 13 by the urging force of the flat springs 14, and to allow the operating element 13 to move away from the attraction surface of the yoke 17 by the urging force of the coil spring 16. In this, the wrap spring 11 is brought into a free state, in which the winding diameter of the spring is expanded by the urging force to allow the wrap spring to come into contact with the inner surface 7A of the input pulley 7, and return to the transmission state.

Alternative Embodiments

The present invention is not limited to the above-described embodiment and may be modified as set forth below. In the alternative embodiments, like reference numerals are used to designate elements having like functions as in the above-described embodiment.

Figure 8:
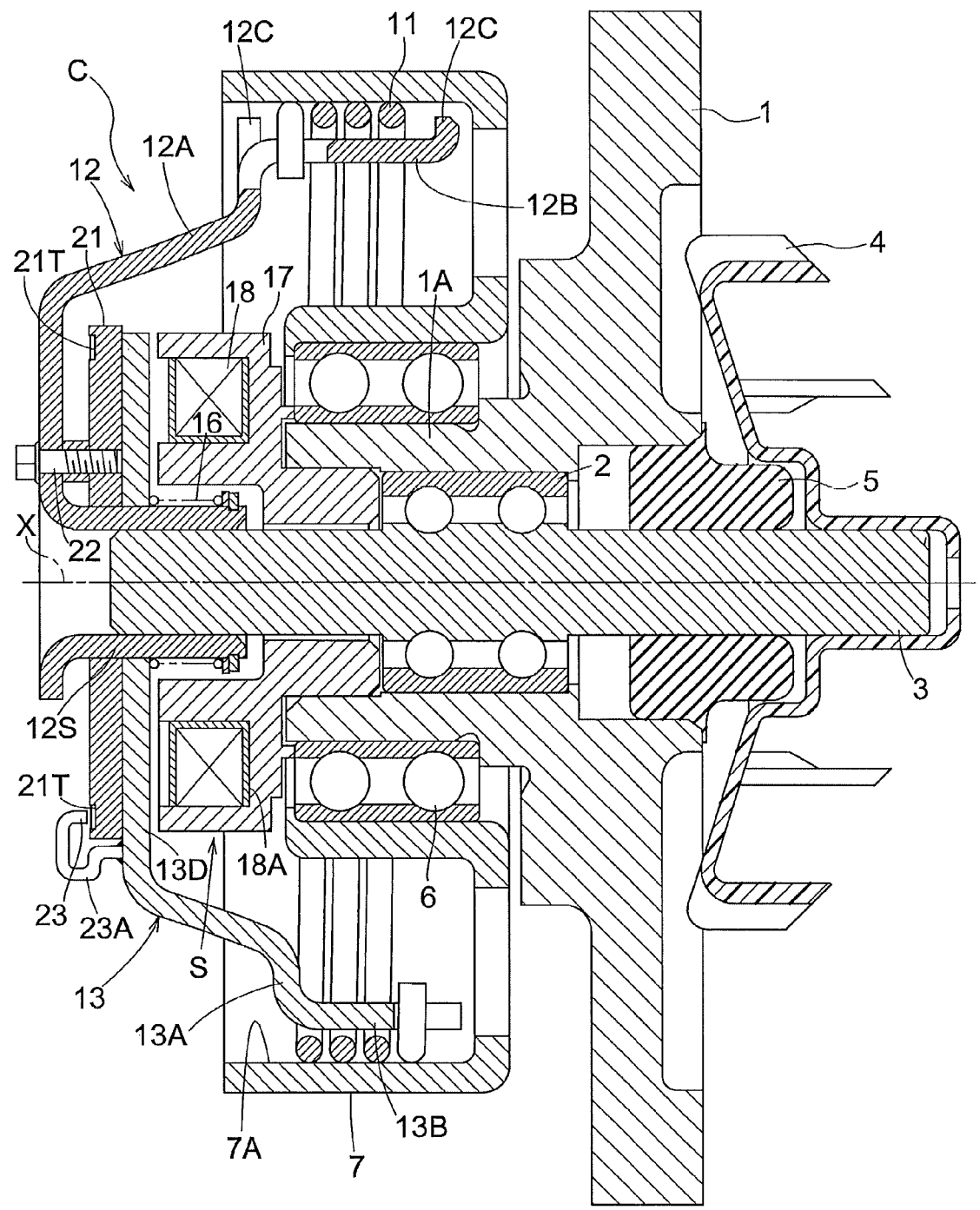
FIG. 8 is a sectional view of a water pump including an electromagnetic clutch according to a modified embodiment (a)

(a) As illustrated in FIG. 8, a disk-shaped lock element 21 is provided in place of the armature 15 of the above-described embodiment. The lock element 21 is fixed to the sleeve 12S of the driving element 12 in position, and includes engaging parts 21T having engaging teeth. The engaging teeth are formed in three arc areas centering about the rotational axis X in a surface of the lock element 12 facing away from the impeller 4. The lock element 21 may be fixedly connected to the shaft 3 directly through interdigitation, for example, or may be fixedly connected to the driving element 12 through screws 22 as shown in FIG. 8.

The urging force of the coil spring 16 acting as urging mechanism is exerted on the operating element 13 to move the operating element 13 away from the electromagnetic solenoid S. The operating element 13 includes three engaging pawls 23 engageable with the engaging teeth of the three engaging parts 21T when the operating element 13 is attracted to the attraction surface of the yoke 17. Further, the engaging pawls 23 have spring portions 23A, respectively, that are integrally formed with the pawls at intermediate portions thereof. The spring portions 23A are resiliently deformed to allow distal ends of the engaging pawls to be displaced to some extent in an engageable or disengageable direction relative to the engaging teeth of the engaging parts 21T.

In the alternative embodiment (a), the engaging parts 21T and the engaging pawls 23 constitute the restraint mechanism of the present invention. More specifically, while the engaging teeth of the engaging parts 21T are formed as serration, the distal ends of the engaging pawls 23 are shaped sharp to engage with and disengage from the engaging parts 21T. The restraint mechanism is configured to repeat engagement and disengagement with/from the distal ends of the engaging pawls 23 by riding over the engaging teeth when the driving element 12 is rotated by dynamic inertia with the engaging pawls 23 being engaged with the engaging parts 21T to perform the same operation as a ratchet mechanism for allowing the rotation of the driving element 12 while preventing rotation of the driving element 12 in the reverse direction.

Therefore, when the operating element 13 is not attracted to the electromagnetic solenoid S, the operating element 13 is maintained in a position to come into contact with the lock element 21 by the urging force of the coil spring 16 acting as the urging mechanism as shown in FIG. 9B, in which the engaging pawls 23 are maintained to be remote from the engaging parts 21T with the operating element 13 being maintained in that position. In this positional relationship, the driving arms 12A of the driving element 12 and the operating arms 13A of the operating element 13 maintain the relative position shown in FIG. 9A to allow the electromagnetic clutch C to achieve the transmission state.

When the electromagnetic solenoid S is electrified to allow the operating element 13 to be attracted to the electromagnetic solenoid S as shown in FIG. 10B, the engaging pawls 23 are brought into engagement with the engaging parts 21T of the lock element 21, and the restraint mechanism allows the rotation of the driving element 12 by dynamic inertia. Then, the rotation of the driving element 12 is stopped when the reverse rotational force caused by the urging force of the wrap spring 11 balances with the dynamic inertia to bring the engaging pawls 23 into engagement with the engaging parts 21T, thereby to prevent the reverse rotation of the driving element 12. When the rotation is stopped, the driving arms 12A of the driving element 12 and the operating arms 13A of the operating element 13 achieve the relative position shown in FIG. 10A to maintain the electromagnetic clutch C in the cutoff state in which the wrap spring 11 is moved away from the inner surface 7A of the input pulley 7.

The alternative embodiment (a) may provide any other configuration acting as the restraint mechanism including mechanical engageable and disengageable portions. For instance, while the engaging part 21T having numerous engaging teeth is formed in an outer circumference of the lock element, the engaging pawl 23 is provided to move in unison with the operating element 13 when the operating element 13 is attracted to the electromagnetic solenoid S to engage with the engaging part 21T in the outer circumference of the lock element. In this alternative embodiment (a), only one engaging pawl 23 may be provided, or three or more engaging pawls may be provided.

Figure 11:
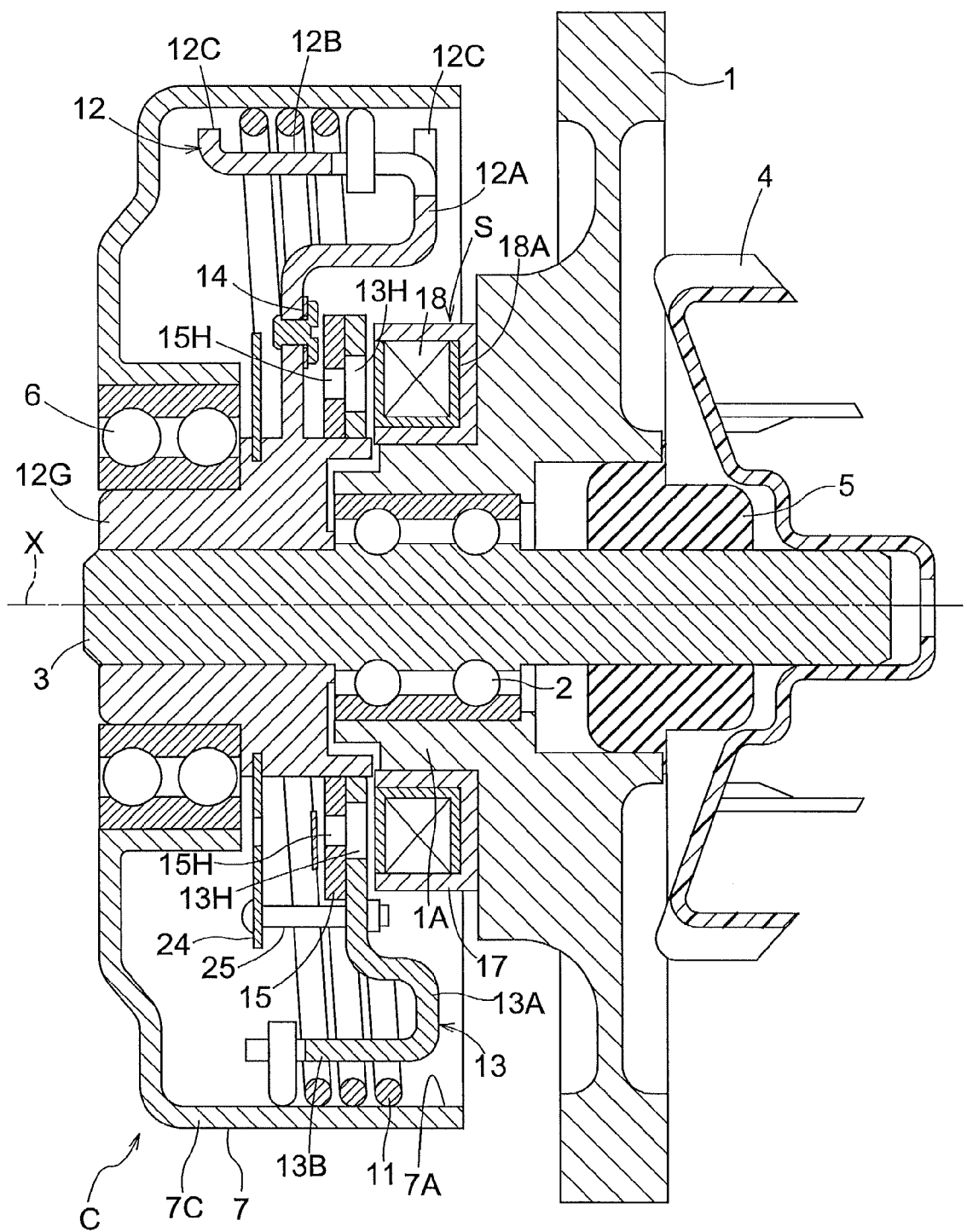
FIG. 11 is a sectional view of a water pump including an electromagnetic clutch according to a modified embodiment (b)

(b) As shown in FIG. 11, the shaft 3 (an example of a driven rotary element) is supported to the pump housing through the shaft bearing 2 to be rotatable about the rotational axis X. The impeller 4 is mounted on the inner end of the shaft 3, and a boss portion 12G of the driving element 12 is fitted on the outer end of the shaft 3. The input pulley 7 (an example of a driving rotary element) is rotatably supported to the boss portion 12G of the driving element 12 through the pulley bearing 6. The wrap spring 11 is provided within the input pulley 7. One end of the wrap spring 11 is supported to one of the three driving arms 12A integrally formed with the boss portion 12G of the driving element 12 as shown in FIG. 12A. The operating element 13 is supported to the boss portion 12G to be rotatable about the rotational axis X. The other end of the wrap spring 11 is supported to one of the three operating arms 13A integrally formed with the operating element 13. The input pulley 7 has the cylindrical portion 7C, and the driving arms 12A and the operating arms 13A are housed within the cylindrical portion 7.

The yoke 17 is supported to the pump housing 1. The operating element 13 is arranged in a position opposite to the attraction surface of the yoke 17, and the armature 15 is arranged in an intermediate position between the operating element 13 and the driving element 12. The armature 15 is supported by the driving element 12 through the three flat springs 14, thereby to allow the driving element 12 and the armature 15 to be rotated in unison and movably supported along the rotational axis X. An urging plate 24 made of flat spring material is supported in an annular groove formed in an outer circumstance of the boss portion 12G of the driving element 12 to be rotatable about the rotational axis X. The urging plate 24 has three projections that are connected to the three operating arms 13A of the operating element 13 through a working rod 25.

With such an arrangement, when the electromagnetic solenoid S is not electrified, the operating element 13 is maintained in a position remote from the electromagnetic solenoid S by an urging force exerted from the urging plate 24, and the armature 15 is maintained in a position close to the driving element 12 by the urging force exerted from the flat springs 14. In this state, the driving arms 12A of the driving element 12 and the operating arms 13A of the operating element 13 maintain a relative position shown in FIG. 12A, thereby to bring the wrap spring 11 into pressure contact with the inner surface 7A of the input pulley 7 to achieve the transmission state (clutch-engaging state).

In the alternative embodiment (b) as well, the operating element 13 and the armature 15 constitute the restraint mechanism. In the same manner as the above-described embodiment, while the plurality of main apertures 13H are formed circumferentially in the operating element 13, the plurality of auxiliary apertures 15H are formed circumferentially in the armature 15. The dimensions and the relative positional relationship of the main apertures 13H and the auxiliary apertures 15H are determined in the same manner as in the above-described embodiment. When the coil 18 of the electromagnetic solenoid S is electrified, the operating element 13 is attracted to the electromagnetic solenoid S to restrain the other end of the wrap spring 11. Then, the driving element 12 is rotated by dynamic inertia to bring the driving arms 12A of the driving element 12 and the operating arms 13A of the operating element 13 to a relative position shown in FIG. 13A, thereby to move the wrap spring 11 away from the inner surface 7A of the input pulley 7. In this state, the armature 15 is attracted to the electromagnetic solenoid S to maintain the cutoff state as shown in FIG. 13B.

Figure 14:
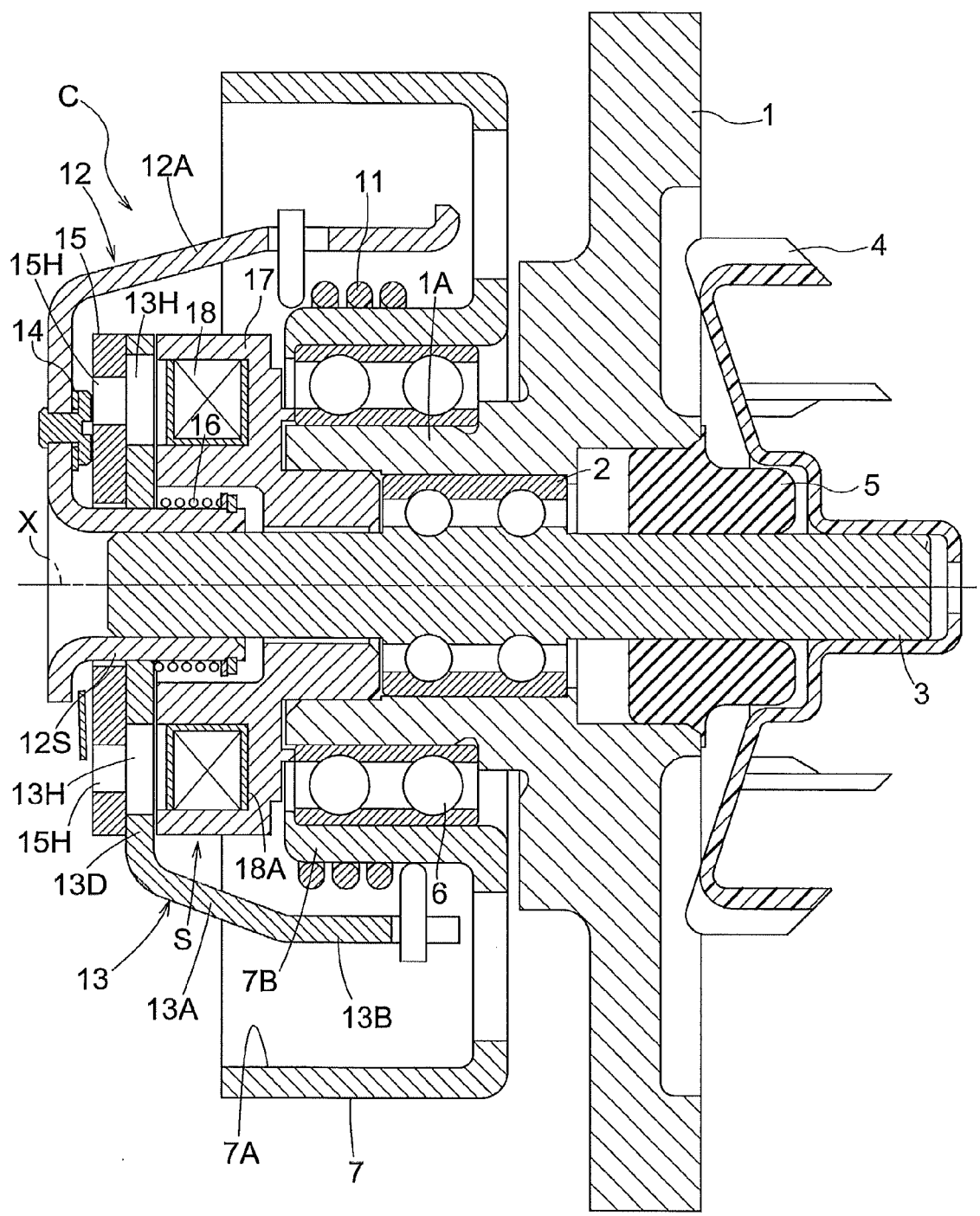
FIG. 14 is a sectional view of a water pump including an electromagnetic clutch according to a modified embodiment (c).

(c) As illustrated in FIG. 14, the electromagnetic clutch C is formed to bring the wrap spring 11 into pressure bonding to an outer circumference of a cylindrical portion 7B formed adjacent the center of the input pulley 7. The electromagnetic clutch C according to the current embodiment has the same configuration as that of the above-described embodiments except for the arrangement of the wrap spring 11 coming into pressure bonding to the outer circumference of the cylindrical portion 7B. Naturally, the wrap spring 11 as used comes into pressure bonding to the outer circumference of the cylindrical portion 7B in the natural state, and the restraint mechanism is constituted by the operating element 13 and the armature 15.

With the above-described arrangement, when the operating element 13 is attracted to the electromagnetic solenoid S, the armature 15 is not attracted to the operating element 13 in the area in which the auxiliary apertures 15H are present within the main apertures 13H, and the driving element 12 continues to rotate by dynamic inertia. When the auxiliary apertures 15H are moved to the external area of the main apertures 13H (where no apertures are present), the armature 15 is attracted to the operating element 13 to move the wrap spring 11 away from the cylindrical portion 7B of the input pulley 7, thereby to bring the electromagnetic clutch C to the cutoff state.

INDUSTRIAL USABILITY

The present invention is applicable to a transmission system for a radiator fan and a supercharger other than the water pump.

The invention claimed is:

1. An electromagnetic clutch comprising:
a driving rotary element and a driven rotary element mounted coaxially with a rotational axis;
a coiled wrap spring centering about the rotational axis; and
a control mechanism for switching the electromagnetic clutch between a transmission state for bring the wrap spring into pressure contact with the driving rotary element by changing a winding diameter of the wrap spring to transmit a rotational force of the driving rotary element to the driven rotary element, and a cutoff state for decreasing the pressure contact force of the wrap spring against the driving rotary element thereby to cut off the rotational force transmitted to the driven rotary element;
wherein the control mechanism includes a driving element connected to one end of the wrap spring to be rotatable in unison with the driven rotary element, an operating element made of magnetic material and connected to the other end of the wrap spring to be rotatable about the rotational axis, and an electromagnetic solenoid supported to a stationary element for attracting the operating element to restrain the operating element,
the control mechanism further includes restraint mechanism for allowing rotation of the driving element caused by dynamic inertia after the operating element is restrained by the attraction of the electromagnetic solenoid in the transmission state to achieve a rotational phase in which the driving rotary element is brought to the cutoff state and then restraining the driving element,
the driven rotary element is formed as a shaft,
the operating element is mounted on the shaft to be relatively rotatable and displaceable along the rotational axis,
an armature made of magnetic material is provided to face the electromagnetic solenoid across the operating element to be rotatable in unison with the shaft and displaceable along the rotational axis, and
the restraint mechanism includes the operating element and the armature, in which a main aperture is formed in a surface of the operating element for attracting the electromagnetic solenoid and an auxiliary aperture is formed in a surface of the armature on which magnetic flux from the operating element is exerted, the main aperture and the auxiliary aperture achieving a positional relationship to allow a drawing force exerted on the armature to increase when the rotational phase in which the driving rotary element is brought to the cutoff state is achieved after the operating element is attracted to the electromagnetic solenoid and then attract and restrain the armature to the operating element by the increased drawing force.

2. The electromagnetic clutch according to claim 1, wherein the driving rotary element has a cylindrical inner surface, and the wrap spring comes into pressure contact with the inner surface in a natural state.

3. The electromagnetic clutch according to claim 1, wherein the driving element includes a driving arm extending radially from the rotational axis,
the driving arm has a retainer piece at an extreme end thereof, the retainer piece extending in a direction parallel to the rotation axis,
the operating element includes an operating arm extending radially from the rotational axis,
the operating arm has a connecting piece at an extreme end thereof, the connecting piece extending in the direction parallel to the rotational axis, and
the retainer piece is connected to the one end of the wrap spring while the connecting piece is connected to the other end of the wrap spring.

4. The electromagnetic clutch according to claim 3, wherein the driving rotary element has a cylindrical portion, and at least one of the driving arm and the operating arm is housed within the cylindrical portion.

5. The electromagnetic clutch according to claim 3, wherein the driving rotary element has a cylindrical portion, and the armature is housed within the cylindrical portion.

6. The electromagnetic clutch according to claim 3, wherein the retainer piece is provided with limiter pieces for limiting expansion of the wrap spring in the direction parallel to the rotational axis.

7. The electromagnetic clutch according to claim 6, wherein the limiter pieces project toward the wrap spring.

8. The electromagnetic clutch according to claim 6, wherein the limiter pieces are provided in opposite sides of the wrap spring in the direction parallel to the rotational axis.

9. The electromagnetic clutch according to claim 1, wherein the operating element is attracted to the electromagnetic solenoid with the auxiliary aperture being positioned within an area of the main aperture and then the auxiliary aperture is moved out of the area of the main aperture, thereby to increase the drawing force exerted on the armature to attract the armature to the operating element.

10. The electromagnetic clutch according to claim 9, wherein the driving element is provided to face the operating element across the armature in the direction parallel to the rotational axis,
the armature is connected to the driving element through a resilient element, thereby to transmit a rotational force of the driving element to the armature and to urge the armature in a direction to move the armature away from the electromagnetic solenoid,
the drawing force of the solenoid exerted on the armature with the auxiliary aperture being positioned within the area of the main aperture is smaller than an urging force of the resilient element, and
the drawing force of the solenoid exerted on the armature with the auxiliary aperture being positioned out of the area of the main aperture is greater than the urging force of the resilient element.

11. An electromagnetic clutch comprising:
a driving rotary element and a driven rotary element mounted coaxially with a rotational axis;

a coiled wrap spring centering about the rotational axis; and a control mechanism for switching the electromagnetic clutch between a transmission state for bring the wrap spring into pressure contact with the driving rotary element by changing a winding diameter of the wrap spring to transmit a rotational force of the driving rotary element to the driven rotary element, and a cutoff state for decreasing the pressure contact force of the wrap spring against the driving rotary element thereby to cut off the rotational force transmitted to the driven rotary element;

wherein the control mechanism includes a driving element connected to one end of the wrap spring to be rotatable in unison with the driven rotary element, an operating element made of magnetic material and connected to the other end of the wrap spring to be rotatable about the rotational axis, and an electromagnetic solenoid supported to a stationary element for attracting the operating element to restrain the operating element, the control mechanism further includes restraint mechanism for allowing rotation of the driving element caused by dynamic inertia after the operating element is restrained by the attraction of the electromagnetic solenoid in the transmission state to achieve a rotational phase in which the driving rotary element is brought to the cutoff state and then restraining the driving element, the driven rotary element is formed as a shaft, the operating element is mounted on the shaft to be relatively rotatable and displaceable along the rotational axis, urging mechanism is provided for urging the operating element in a direction to move the operating element away from the electromagnetic solenoid, a lock element is connected to the shaft to face the electromagnetic solenoid across the operating element, and the restraint mechanism includes the lock element, and further includes an engaging part having engaging teeth formed in the lock element, and an engaging pawl engageable with the engaging part for allowing rotation of the lock element caused by the dynamic inertia when the operating element is attracted to the electromagnetic solenoid and preventing rotation in a direction to prevent the rotation of the lock element caused by an urging force of the wrap spring.

12. The electromagnetic clutch according to claim 11, wherein the driving rotary element has a cylindrical inner surface, and the wrap spring comes into pressure contact with the inner surface in a natural state.

13. The electromagnetic clutch according to claim 11, wherein the driving element includes a driving arm extending radially from the rotational axis, the driving arm has a retainer piece at an extreme end thereof, the retainer piece extending in a direction parallel to the rotation axis, the operating element includes an operating arm extending radially from the rotational axis, the operating arm has a connecting piece at en extreme end thereof, the connecting piece extending in the direction parallel to the rotation axis, and the retainer piece is connected to the one end of the wrap spring while the connecting piece is connected to the other end of the wrap spring.

14. The electromagnetic clutch according to claim 13, wherein the retainer piece is provided with limiter pieces for limiting expansion of the wrap spring in the direction parallel to the rotational axis.

15. The electromagnetic clutch according to claim 14, wherein the limiter pieces project toward the wrap spring.

16. The electromagnetic clutch according to claim 14, wherein the limiter pieces are provided in opposite sides of the wrap spring in the direction parallel to the rotational axis.

17. The electromagnetic clutch according to claim 11, wherein the engaging teeth are formed in arc areas centering about the rotational axis in a surface of the lock element facing away from the operating element.

18. The electromagnetic clutch according to claim 11, wherein the engaging teeth are formed in an outer circumference of the lock element.

* * * * *